United States Patent [19]

Cocke et al.

[11] Patent Number: 4,992,938
[45] Date of Patent: Feb. 12, 1991

[54] INSTRUCTION CONTROL MECHANISM FOR A COMPUTING SYSTEM WITH REGISTER RENAMING, MAP TABLE AND QUEUES INDICATING AVAILABLE REGISTERS

[75] Inventors: John Cocke, Austin; Gregory F. Grohoski, Cedar Park, both of Tex.; Vojin G. Oklobdzija, Carmel, N.Y.

[73] Assignee: International Business Machines Corporation, Armonk, N.Y.

[21] Appl. No.: 469,813

[22] Filed: Apr. 23, 1990

Related U.S. Application Data

[63] Continuation of Ser. No. 68,597, Jul. 1, 1987, abandoned.

[51] Int. Cl.[5] .......... G06F 9/00; G06F 15/31; G06F 12/02

[52] U.S. Cl. .................. 364/200; 364/246.3; 364/244.3

[58] Field of Search ... 364/200 MS File, 900 MS File

[56] References Cited

U.S. PATENT DOCUMENTS

| 4,378,590 | 3/1983 | Kim ................................ | 364/200 |
| 4,493,020 | 1/1985 | Kim et al. ...................... | 364/200 |
| 4,574,349 | 3/1986 | Rechtschaffen ................ | 364/200 |
| 4,736,288 | 4/1988 | Shintani et al. ................ | 364/200 |
| 4,752,873 | 6/1988 | Shonai et al. .................. | 364/200 |

*Primary Examiner*—Lawrence E. Anderson
*Attorney, Agent, or Firm*—Jack M. Arnold

[57] ABSTRACT

A floating point instruction control mechanism which processes loads and stores in parallel with arithmetic instructions. This results from register renaming, which removes output dependencies in the instruction control mechanism and allows computations aliased to the same register to proceed in parallel.

5 Claims, 17 Drawing Sheets

FIG. 12 MACHINE STATE DURING CYCLE 3

MACHINE STATE DURING CYCLE 4

FIG. 14 MACHINE STATE DURING CYCLE 5

MACHINE STATE DURING CYCLE 6

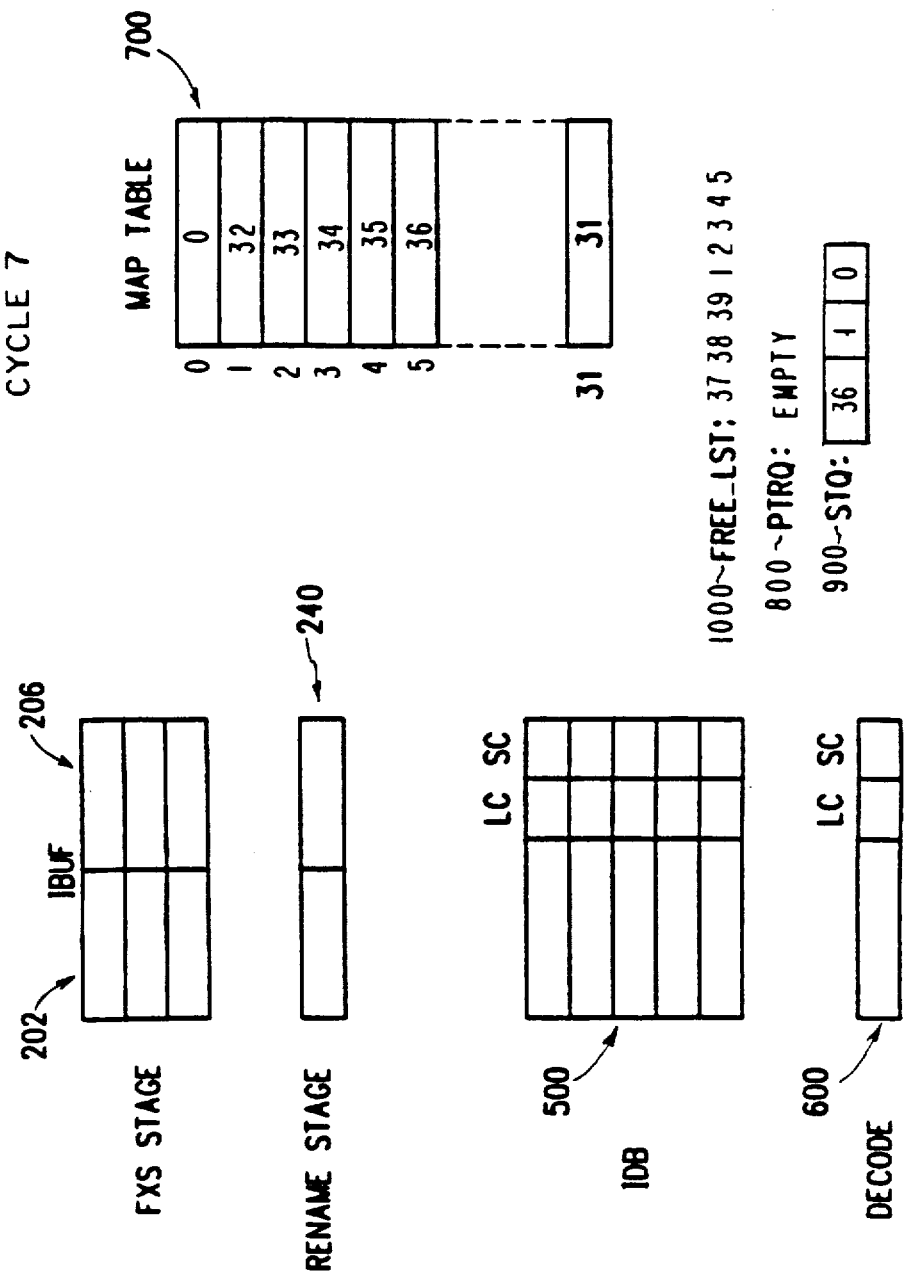

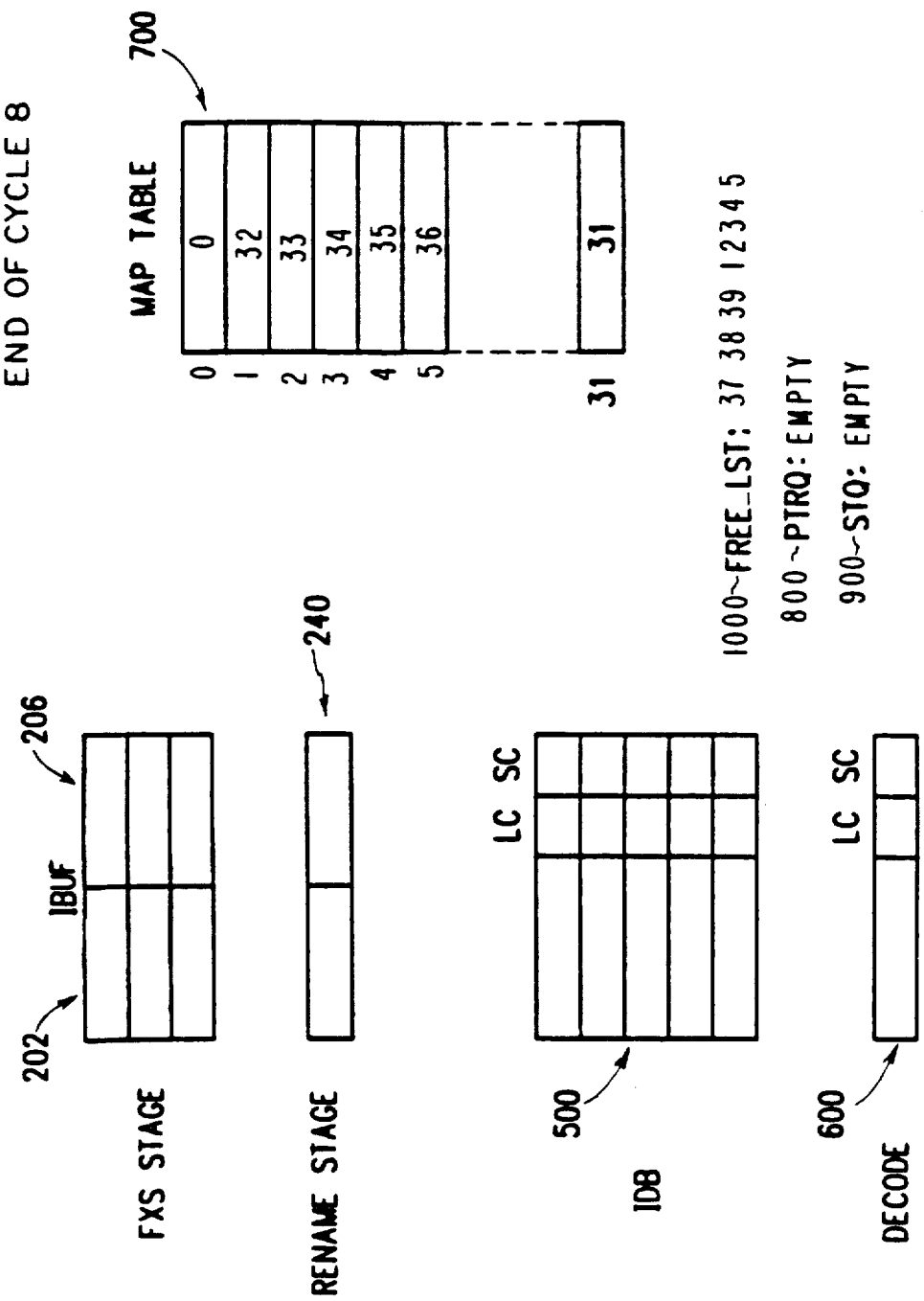

INSTRUCTION CONTROL MECHANISM FOR A COMPUTING SYSTEM WITH REGISTER RENAMING, MAP TABLE AND QUEUES INDICATING AVAILABLE REGISTERS

This is a continuation application of Ser. No. 07/068,597, filed July 1, 1987, now abandoned.

DESCRIPTION

1. Field of Invention

The invention is in the field of computing systems, and specifically is directed to an instruction control mechanism. In particular, an instruction control scheme is provided which utilizes register renaming such that loads and stores are processed in parallel with arithmetic instructions.

2. Background of the Invention

The subject invention finds use in high performance computing and data processing systems. For example, the invention may be used in a Central Processor Unit (CPU)-Coprocessor Complex which processes instructions including floating point arithmetic operations. Further, the invention uses a register renaming scheme to permit parallelism among floating point operations.

The prior art discloses a number of register renaming schemes, each having certain advantages and disadvantages.

U.S. Pat. No. 4,378,590 issued Mar. 29, 1983 to Kim and entitled, "Register Allocation Apparatus" discloses a register selection apparatus which includes a plurality of specially mapped programmable memories each addressed by a respective portion of an updatable allocation register which indicates the free and assigned states of a plurality of registers. The resulting memory word read out from the memories are applied to a plurality of multiplexers for identifying a particular predetermined group of registers as being available for assignment. The memory words also provide signals for use in determining whether a sufficient number of free registers are currently available for assignment.

U.S. Pat. No. 4,493,020 issued Jan. 8, 1985 to Kim et al and entitled, "Microprogrammed Digital Data Processor Employing Microinstruction Tasking and Dynamics Register Allocation" discloses a microprogrammed data processing system in which each high level instruction is performed by one or more tasks, each task being in turn performed by executing one or more task microinstructions in a microprogrammed manner. Dynamic resource allocation is provided by employing a plurality of dynamically allocatable registers whose free and use states are continuously monitored in an allocation register. The outputs of the allocation register are used as an address for a register allocation memory which is mapped so as to identify a particular group of free registers which are available for assignment for each new task in response to the allocation register address.

Each of the above patents detail a means of allocating a group of physical registers to logical registers required by task. Both are concerned with mapping a group of registers required for the execution of a task, which is defined in U.S. Pat. No. 4,493,020 as a sequence of microinstructions performed in order to execute a high-level instruction. All registers are allocated at the beginning of a task and de-allocated upon task completion. Moreover, the use of renaming is not specifically to overlap loads with the operations of a coprocessor, but rather to simplify the problem of allocating a set of general purpose registers (GPR's) for a specific computation.

U.S. Pat. No. 4,574,349 issued Mar. 4, 1986 to Rechtschaffen and entitled "Apparatus For Addressing a Larger Number of Instruction Addressable Central Processor Registers Than Can Be Identified By A Program Instruction" discloses a system in which each of a plurality of stored pointers identifies and accesses one of a plurality of hardware registers in a central processing unit (CPU). Each pointer is associated with and corresponds to one of a limited number of general purpose registers addressable by various fields in a program instruction of the data processing system. At least one program instruction calls for transfer of data from a particular main storage location to a general purpose register (GPR) identified by a field in the program instruction. The GPR identified as the destination for the data is renamed by assigning a pointer value to provide access to one of the plurality of associated hardware registers. A subsequent load instruction involving the same particular main storage location determines if the data from the previous load instruction is still stored in one of the hardware registers and determines the associated pointer value. The data in the hardware register is made immediately available to the CPU before completion of the access to main storage. The pointer value is associated with, and made to correspond to the destination GPR of the subsequent load instruction. Other instructions which require access to instruction addressable GPR's cause access to the corresponding pointer value to provide access to the corresponding hardware register for purposes of data processing.

Rechtschaffen renames the target registers of load instructions to a much larger set of physical registers. The prime motivation is to use the extra physical registers as buffer storage. If a previously loaded value exists in the physical registers, than an operation requiring this value may proceed without waiting for a memory access to provide it.

According to the present invention, architected registers are mapped to physical registers upon the creation of a new value for the architected register. This occurs both for load instructions as well as arithmetic instructions. This register mapping does not restrict the mapping of architected to physical registers. Rechtschaffen constrains each physical register to belong to only one architected register. This invention allows any architected register to map to any physical register, resulting in a much more efficient utilization of the available physical registers. The instant invention makes no attempt to utilize the extra registers as additional storage for previously loaded values. Whenever a new load instruction is encountered, the data is loaded from memory without searching the physical registers for the data. Thus, there is no requirement for any associative memory storing memory addresses to be compared against that of new loads.

The overlapping of two processing elements is improved by allowing loads to proceed before an execution element has finished computing the old value of a register. There is a specific allocation and de-allocation of registers, which is accomplished through a load-counting mechanism. The invention maps registers belonging to a different architectural group (floating point registers) than the registers uses for address computations. Multiple instructions, such as loads and stores can be remapped in parallel with arithmetic operations per cycle.

DISCLOSURE OF THE INVENTION

A control mechanism for allowing parallism among floating point operations by overlapping loads and stores with other instructions. The correct sequence of results is maintained by register renaming, that is by removing the final assignment of architected registers to physical registers.

BRIEF DESCRIPTION OF THE DRAWINGS

FIGS. 10-17 are machine state diagrams which are indicative of the logical states of the register renaming stage during different cycles of the system operation.

BEST MODE OF CARRYING OUT THE INVENTION

Figure 1:
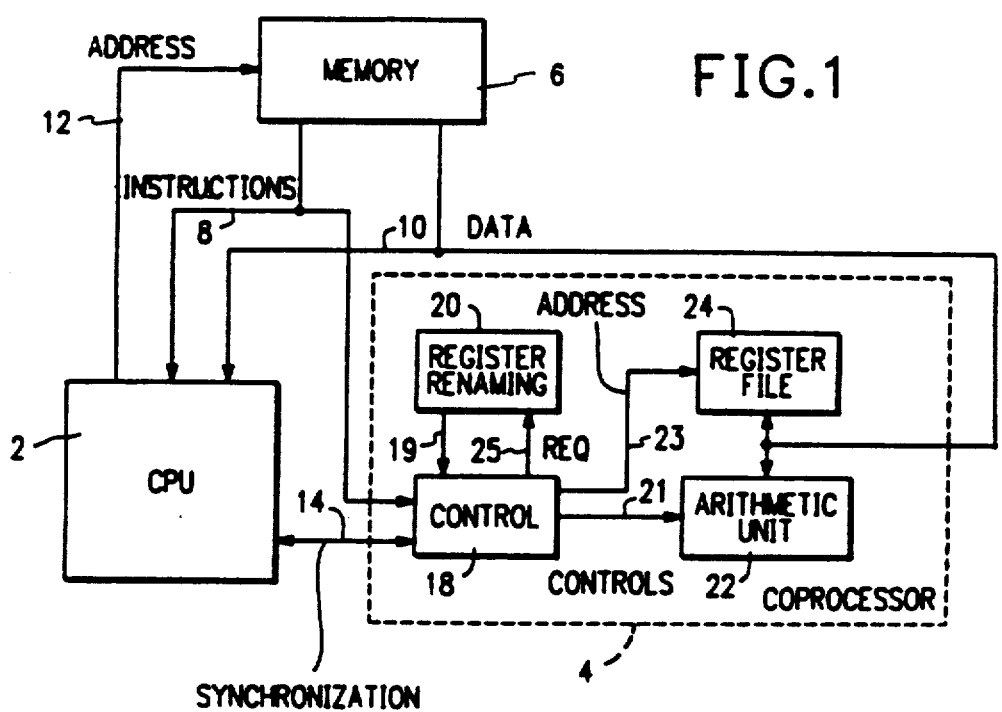
FIG. 1 is a block diagram representation of a CPU-Coprocessor complex.

An instruction control scheme is set forth for a central processor (CPU) coprocessor complex which results in improved coprocessor performance over existing schemes. The improved performance results from register renaming, which allows loads and stores to be processed in parallel with arithmetic instructions, and which also removes output dependencies in the instruction stream and allows computations aliased to the same register to proceed in parallel.

This scheme can be applied to any coprocessor in the system which sends data to and from memory, and synchronizes with the CPU in order to execute instructions.

While this coprocessor instruction control scheme is described in one particular implementation, one can realize other implementations using the same concepts of register renaming and parallel loads and stores. For example, while this particular implementation processes 2 instructions per cycle, register renaming can be applied to a single instruction per cycle scheme. Furthermore, register renaming may be applied to any physical register set in the machine: GPR's, FPR's, status/control registers, etc.

Essential elements of this invention include a means of allocating physical registers to architected registers and the flexible use of the implemented processor registers. A means of resolving register contention without delay penalty is utilized, and loads and stores are performed in parallel with the coprocessor arithmetic operation and are implemented in a minimum control space.

The invention further includes mapping between the implemented and the architected processor registers, and has means of associating load and store instructions with the arithmetic instructions in order to minimize control.

GENERAL DESCRIPTION

The invention may be applied to a CPU-coprocessor complex which consists of a CPU which executes fixed-point arithmetic operations, fixed point loads and stores, and initiates loads and stores to registers in the coprocessor. The main functional blocks in the coprocessor include overall coprocessor control, register renaming, a register file, and an arithmetic processing logic.

Such a system can operate as follows. Instructions are fetched from memory and are sent to both the CPU and the coprocessor. The CPU executes instructions and cooperates in the execution of coprocessor instructions. The coprocessor ignores CPU instructions and synchronizes with the CPU in order to execute its own instructions. Once the CPU and coprocessor decide to execute an instruction, the coprocessor control passes the instruction to the coprocessor arithmetic unit and subsequent instructions are considered for execution.

Consider the situation where the CPU tries to load a coprocessor register from memory. If, in this case, the coprocessor register is being used by the coprocessor arithmetic unit, the CPU can not initiate the load. This degrades performance. The proposed solution is to use register renaming to allow loads to be executed even though the coprocessor may be using the register. In this way the CPU does not wait for the register to become free and the resulting performance is nearly optimal.

In the description that follows, the invention is set forth assuming that the coprocessor is a floating point unit.

Register renaming refers to a technique of mapping architected register numbers (register numbers as they appear in instructions fetched from memory) to a set of registers which physically exist in the machine. The number of physical registers may exceed the number of architected registers. For purposes of description, a machine which uses register renaming for the 32 architected floating point registers (FPR's) and physically implements 40 FPR's is set forth.

In order to map the registers of incoming floating point instructions, a renaming stage, is employed. The renaming stage performs the register renaming It consists of a mapping table (MT), a Pending Target Return Queue (PTRQ), a Store Queue (STQ), and a Free List (FREE_LST).

Map Table (MT)

The MT is implemented as two 6 port RAMS, each organized as 4-read port/2 write port memories. Each memory has 32 entries and each entry is 6 bits wide. Each entry in the memory contains the number of a physical register which will be inserted into the register fields of an instruction prior to its execution.

Pending Target Return Queue (PTRQ)

The PTRQ is a holding register queue which is organized as a 2 read port/2 write port RAM. The PTRQ serves as a temporary buffering area for register tags before they are returned to the FREE_LST. It contains a maximum of eight 6-bit entries.

Store Queue (STQ)

The STQ contains a list of floating point registers which are stored to memory when the data for the register has been produced by the floating point arithmetic unit. It consists of four registers each containing a 6-bit register tag, and two control bits. Various comparators and multiplexors are also required. When a floating point store is processed by the mapping stage, the tag is placed onto this queue. The tag is removed from the queue after the data is available. In certain circumstances the tag will also be placed on the FREE_LST.

Free List (FREE_LST)

The FREE LST contains a list of physical registers which are currently unassigned to logical registers. When a new physical register is required, it is removed from the head entry of this queue and provided to the MT. When physical registers become free, they are placed on this queue from the PTRQ and the STQ as described below. It is implemented as a 5 port RAM organized as a 2 read/3 write port memory. It contains a maximum of eight 6-bit entries.

The MT receives a total of eight register fields from two instructions and provides eight new register fields. There are two inputs to the MT from the FREE_LST and two outputs to the PTRQ.

The PTRQ provides two outputs to the FREE_LST and receives two inputs from the MT.

The STQ receives its input from the MT and provides its output to the FREE_LST.

The two outputs of the FREE_LST feed the MT. Two inputs are provided from the PTRQ and one is provided from the STQ.

REGISTER RENAMING

An incoming instruction has its registers renamed as set forth below.

Each source register reads the corresponding entry from the Map Table and the register number in the instruction is replaced by the register number designated in the Map Table. For instance, register 12 may have an entry of 36 in the Map Table and thus when register 12 was used as a architected source, physical register 36 would replace architected register 12 in the instruction, so that physical register 36 currently contains the value for architected register 12.

Target registers (registers specified to receive the result of an operation contained in a certain instruction) are mapped differently than source registers. Since a target register will contain a new value of the named architected register, a new physical register is needed to contain this new value. This is accomplished by defining a new mapping for the target register in the Map Table, and destroying the old mapping. The new mapping is accomplished by using a currently unused physical register as the new mapping of architected to physical.

The General Operation of the FREE_LST and the PTRQ

If the head of the FREE_LST is physical register 6, and the target register being mapped is architected register 14, and the current mapping is physical register 12, then in the Map Table entry for architected register 14, physical register 6 overwrites physical register 12, and register 12 is placed on the tail of the PTRQ. Physical register number 6 is then removed from the FREE_LST.

The operation of the FREE_LST and the PTRQ is described as set forth below. The FREE_LST contains a list of free physical registers. Initially, the Map Table is set to the identity function (architected register 0 maps to physical register 0, 1 to 1, etc.), and the FREE_LST contains 8 free physical register numbers (32-39, since there are 40 total physical registers.) As instructions flow past the rename stage, the entries of the Map Table change, and physical registers are consumed from the head of the FREE_LST. The old mappings are placed on the tail of the PTRQ.

As previously noted, the PTRQ is a holding register queue which serves as a temporary storage for physical register numbers whose corresponding architected or logical registers have been remapped but that the machine may not be done with. This is due to the delay between the time that physical registers are remapped in the Rename stage, and the time physical registers can be placed on the FREE_LST (at the successful completion of Decode cycle). In order to remove a register tag from the PTRQ and place it on the tail of the FREE_LST, one necessary condition is that no instruction currently under execution is using the physical register corresponding to the tag. In the implementation under consideration, arithmetic instructions access the physical register file during the Decode cycle. Thus, once an instruction has completed Decode, tags can be removed from the PTRQ and added to the tail of the FREE_LST.

Rules for renaming registers

The assumed floating point instruction format is:
RR ops: OP $S_1$, $S_2$, $S_3$, T
Loads: LT, $G_1$, $G_2$
Stores: ST $S_1$, $G_2$, $G_3$ were OP is an opcode for a register-to-register instruction, such as a multiply; each S denotes a source operand register, G denotes a fixed point source address register; T denotes a target register, and for a store instruction $S_1$ is the floating point register which contains the data to be stored to memory. The procedure for renaming each type of floating point instruction is set forth below.

Rules for renaming RR ops: First, each architected source register is used to address the map table entry for the corresponding physical register and replaced with the value found in the map table. All sources access the map table in parallel. The target register, T, also is used to address the map table. The value found in the map table for the target register is written to the tail of the pending target return queue, as step 2 below. The target is then renamed to a new physical register by using the register tag at the head of the FREE_LST, and this value is written into the rename table to reflect the new mapping.

1. $S_1$ MT[$S_1$];
$S_2$ MT[$S_2$];
$S_3$ MT[$S_3$];
2. PTRQ.tail MT[T]
3. MT[T] FL.head
4. T FL.head Rules for renaming loads: Since the source registers of floating point loads are fixed point registers, there are no sources to remap. Thus only the target is mapped to a new physical register. Thus the same operation is performed for the target of a floating point load as was performed for the target of a floating point register-to-register operation.

1. PTRQ.tail MT[T]
2. MT[T] FL.head
3. T FL.head

Rule for renaming stores: Since a floating point store does not create a new value of a floating point register, a new mapping is not created. However, in order to store the value in memory, the physical register containing the value for the architected register must be accessed. Thus only a source-like access of the map table is required.

1. T MT[T]

Floating point loads

Until this point, loads and stores have not been discussed. In the implementation under consideration, loads and stores are performed in parallel with floating point arithmetic operations. Loads define a new value of an architected or logical register; thus, they are remapped in the same fashion as target registers. They consume a value from the FREE_LST, define a new mapping in the MT, and place the old map value on the PTRQ.

In order to execute loads in parallel with arithmetic instructions, loads are not placed into the IDB (Instruction Decode Buffers). The renamed target value is placed into a Load Bypass Register so that data returning from the memory system can be written to the corresponding register in the register file. However, the old tag taken from the Map Table must be returned from the PTRQ and placed on the FREE_LST. The old tag can be returned to FREE_LST only after all instructions which reference that register have completed. In order to know when the last reference has completed, the load is associated with the last arithmetic instruction in the program sequence.

Load counting

In order to associate a load with an arithmetic instruction, the concept of LOAD COUNTING (LC) is introduced. The LC is associated with each floating point arithmetic instruction and is used to release a specified number of tags from the PTRQ so that they can be placed on the FREE_LST. The LC can range from 0 to a maximum of the number of extra physical registers (8, for this implementation). The load count specifies the number of floating point loads which have occurred in the program sequence between floating point arithmetic instructions, plus one if the arithmetic instruction also requires a new target value. Some arithmetic instructions, such as floating point compares, do not have a target register. All others do and these always have a load count of at least 1. Subsequent floating point loads increment the value in the LC for the floating point arithmetic instruction. An arithmetic instruction with a load count of 2 indicates that 2 tags would be returned to the FREE_LST when the instruction decodes. One tag would be for the old target tag of the arithmetic instruction, and the other would be for the old tag of the load.

The PTRQ, in addition to having physical head and tail pointers, also has a logical tail pointer which is termed the release pointer and must lie between the head and tail pointers (inclusively). When an arithmetic instruction successfully passes decode, the LC field is added to the release counter for the PTRQ. A state machine then tries to remove tags from the head to the release pointer on the PTRQ and place them on the FREE_LST (in the implementation, this is limited to 2 per cycle; though the release counter can be advanced as much as 8).

By keeping the LC, only as many register tags as have been used by the instruction and its subsequent loads are returned to the FREE_LST, and load instructions do not have to pass through the floating point decode stage.

Floating point stores and the STQ

The STQ provides a means of delaying stores and processing them asynchronously as the data to be stored in memory is produced. By using the concept of store counting (SC) in the STQ, store instructions are performed in parallel with arithmetic instructions. Thus floating point stores do not pass into the IDB and are not decoded by the Decode stage. The STQ has three pointers; a head, a tail, and a release pointer. Each entry on the STQ contains a register tag for the register whose data is to be stored, and 2 control bits, GB and CE, for Give-Back and Compare-Enable, respectively.

The purpose of the CE and GB bits is the following:

When a register number is removed from the PTRQ to be placed on the FREE_LST, it may be that a store is still waiting to send the data stored in that register to the memory. Therefore, the tags removed from the PTRQ are compared with all entries on the STQ. If a match occurs, the last store on the STQ which matches a given register number has its GB bit set. When this store leaves the STQ, since its GB bit is set, it returns the register number to the FREE_LST.

There can be more than one store requests for a particular register on the STQ. The CE (Compare Enable) bit identifies the last store operation for a particular register. When a new store is placed on the STQ, it is identifies as the last store request on the queue for that register by setting its CE bit to 1. If there is already a store request for that register on the STQ, its CE bit is reset.

In order to overlap stores with arithmetic operations, store counting is performed. Store counting is similar to load counting. An SC field is maintained for each arithmetic instruction. Stores are associated with the most recent arithmetic instruction in the program sequence, since this instruction was the last one which could have produced the data for the store.

As floating point stores pass the Rename stage, the source register for the store is used to access the MT and is renamed to a physical register. This physical register tag is placed on the STQ. The GB and CE bits are set to 0 and 1, respectively. The store count associated with the most recent floating point arithmetic instruction is incremented. When the arithmetic instruction completes Decode, the SC is added to the release pointer for the Pending Store Queue. The store count ensures that stores will not be issued before their data has been produced.

A state machine at the head of the STQ tries to remove one store per cycle. It examines the head entry on the queue. If it has been released, indicating that the associated arithmetic instruction has decoded, and the physical register is not busy waiting for data from a previous load, or for a result from the floating point arithmetic unit, it is removed.

Once removed, the data is placed into a buffer and the coprocessor is informed that data is ready for a floating point store. The coprocessor may then store the data into memory.

DETAILED DESCRIPTION

Refer to FIG. 1, which depicts a system consisting of a central processor (CPU) 2, a coprocessor 4 and a memory 6. The memory 6 provides instruction via line 8 and data via line 10 to the CPU 2 and coprocessor 4, based upon addresses provided by the CPU on line 12. The CPU 2 and coprocessor 4 synchronize via line 14.

The coprocessor 4 comprises a control unit 18, a register renaming logic 20, an arithmetic unit 22 and a register file 24. The control unit 18 synchronizes with the CPU 2 via line 14, receives control information via line 19, and provides requests via line 25 to the register renaming logic 20. The register file 24 receives address on line 23 from the control block 18 and data from memory 6 and the coprocessor arithmetic unit 22. The arithmetic unit 22 operates on data on line 10 based upon control signals on line 21 from the control unit 18.

Figure 2:
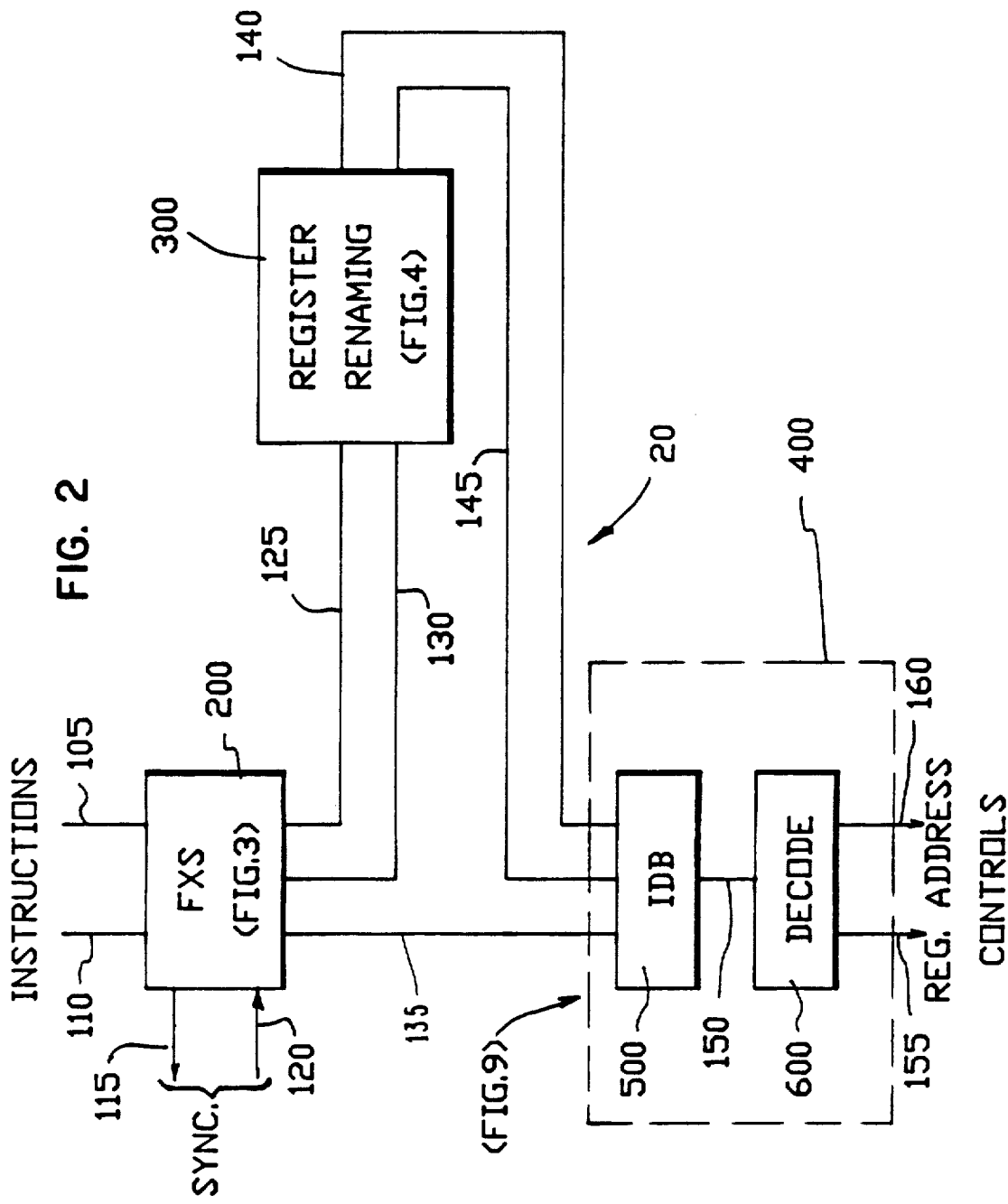
FIG. 2 is a block diagram representation of the register renaming stage which is shown generally in FIG. 1.

Refer to FIG. 2 which details the control unit 18 and the register renaming logic 20 of FIG. 1. The control 18 is comprised of CPU synchronization block FXS 200 and a logic unit 400. The register renaming unit 20 of FIG. 1 is designated as 300 in FIG. 2. Two instructions at a time from memory 6 flow into the CPU fixed point synchronization block, FSS 200, over lines 105 and 110. Synchronization with the CPU 2 occurs over lines 115 and 120. Line 115 enables the coprocessor 4 to hold the CPU 2, and line 120 enables the CPU 2 to hold the coprocessor 4. FXS unit 200 provides register tags of 2 instructions via lines 125 and 130 to the register renaming unit 300. FXS 200 also provides the operation codes of the 2 instructions to an instruction decode buffer (IDB) stage logic 500 contained in logic unit 400.

The IDB 500 buffers instruction opcodes on line 135, and their associated renamed register fields on lines 140 and 145 for the decode stage 600 in logic unit 400. The IDB 500 provides an instruction at a time to the decode stage 600 via line 150. The decode stage 600 prepares instructions for final decoding and sends register address on line 155 and control signals on line 160 to the register file 24 and arithmetic unit 22, respectively as shown in FIG. 1.

Figure 3:
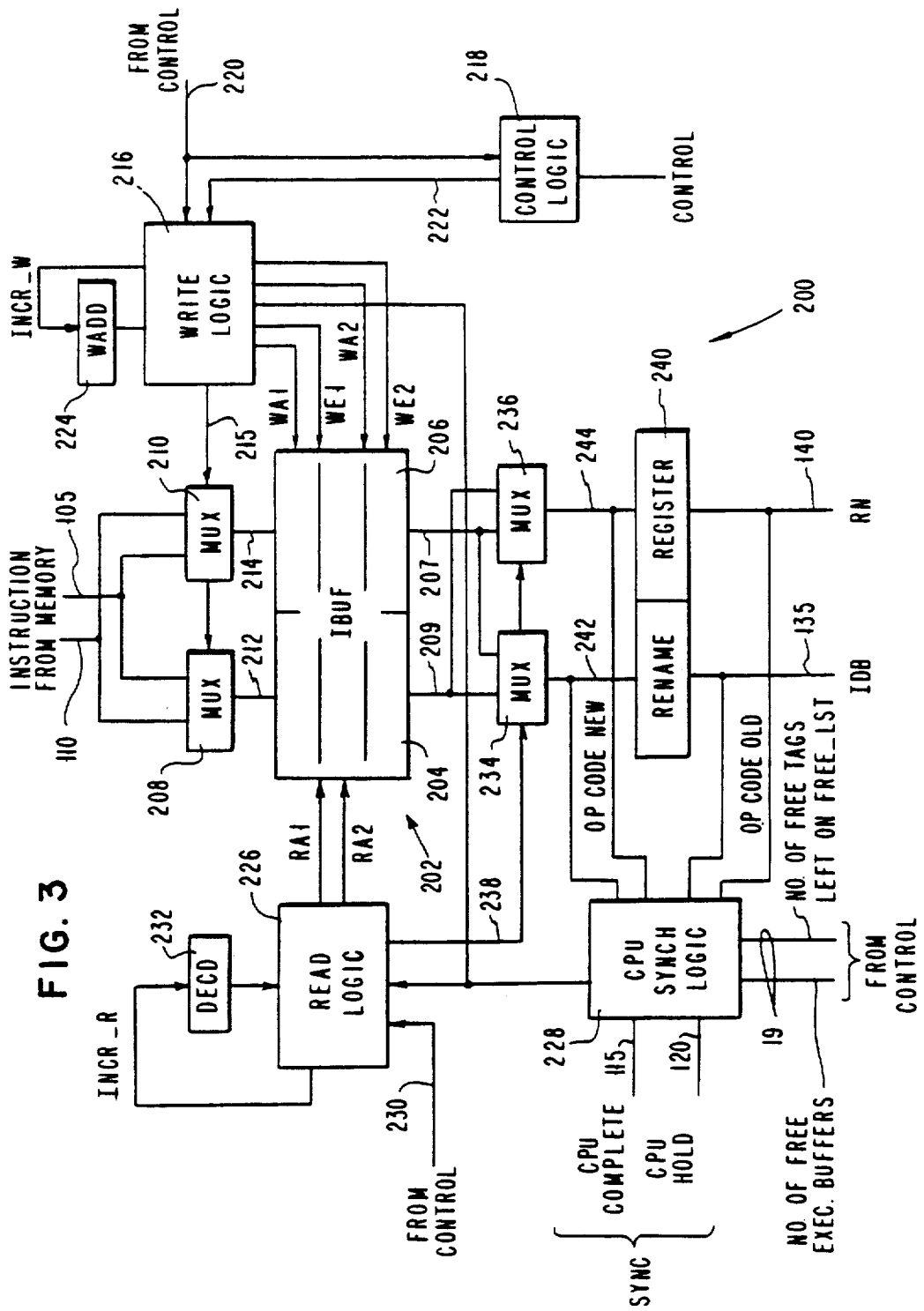
FIG. 3 is a block diagram representation of the fixed point synchronization unit which is shown generally in FIG. 2.

FIG. 3 details the FXS block 200 of FIG. 2, whose purpose is to receive and buffer the instructions dispatched to the coprocessor 4, and synchronize the operation of the coprocessor 4 with the fixed point CPU 2. Two instructions at a time from memory 6 (FIG. 1) are provided via lines 110 and 105 to multiplexors 208 and 210 to be sorted to buffer positions in an IBUF instruction buffer block 202 via multiplexor outputs 212 and 214. A write logic 216 controls the multiplexors 208 and 210 via control line 215 by decoding the write address pointer (WADD) 224. The write logic 216 also provides write address and write enable signals to the IBUF 202 via lines WA1, WE1, WA2 and WE2 by decoding the write address pointer 224. Based upon instruction valid signals on line 220 from the control logic 218 instructions are written into the IBUF 202. The write address pointer 224 is then incremented by an appropriate amount and updated via the Incr. W line from the write logic 216.

During the next machine cycle, instructions which were written into the IBUF 202 may be read out under control of read logic 226 and processed by the CPU synchronization logic 228. The read logic 226 provides 2 read addresses RA1 and RA2 to the IBUF 202 to read out 2 instructions via lines 207 and 209, based upon the decoded read address stored in read address register (DECD) 232. Further decoding in register 232 by the read logic 226 results in the selection via line 238 of data at multiplexors 234 and 236 to provide the 2 instructions on lines 242 and 244 to the synchronization logic 228. Based upon control signals from the CPU 2 on line 115, instructions from the IBUF on lines 242 and 244, instructions from the rename register 240 via lines 135 and 140, and other control signals on line 19 dealing with the size of the IDB 500 and the size of the FREE-LST 1000, to be discussed relative to FIG. 8, a decision is made to hold the CPU 2 via line 120, or to allow the instructions from the rename register on lines 135 and 140 to proceed to the next pipeline stage and to allow instructions from IBUF 202 to proceed to the rename register 240 via lines 242 and 244.

Figure 4:
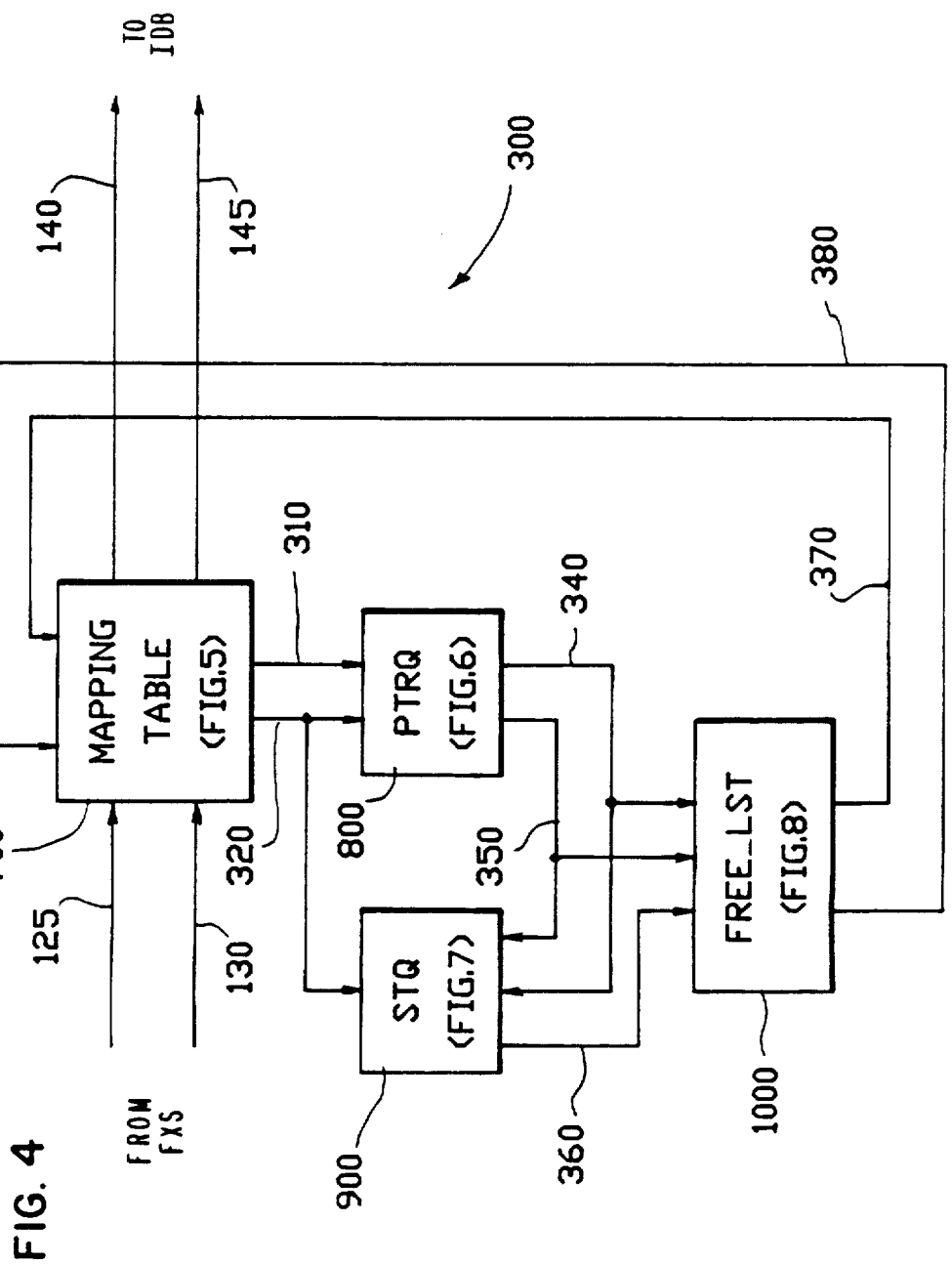
FIG. 4 is a block diagram representation of the mapping stage which is shown generally in FIG. 2.

Refer now to FIG. 4 for the details of the register renaming block 300 of FIG. 2. The register renaming logic 300 consists of four main functional blocks. A mapping table 700 is a memory which contains physical register tags. It can rename the architected register number of 2 instructions simultaneously via lines 125 and 130 provided by the FXS logic 200, which are logically equivalent to lines 135 and 140 of FIG. 3. These register fields are used to address the map table 700 via lines 125 and 130 and new physical register fields are provided ed via lines 140 and 145 to the IDB logic block 400 which is shown in general in FIG. 2 and in detail in FIG. 9. These new, "remapped" register fields are used in FIG. 1 by the decode logic 600 to access the register file 24 to provide data on line 10 to the arithmetic unit 22 and the memory 6.

The mapping table 700 also provides 2 register tag outputs 310 and 320 to a pending target return queue (PTRQ) 800. These register tags will eventually be returned to a FREE list 1000 and they represent the old contents of the map table entry for the target of an incoming instruction on lines 125 and 130. The mapping table 700 also provides via line 320 a register number for the store queue (STQ) 900.

The PTRQ 800 is a list of physical registers which are currently in use by the arithmetic unit 22 (FIG. 1) but will shortly be available for remapping when the arithmetic unit has finished using them. When the registers become free, they are moved at a maximum rate of 2 at a time to the FREE-LIST 1000 via lines 340 and 350.

The STQ 900 contains a list of physical registers whose data must be sent to memory 6 (FIG. 1) via lines 10 when the data is produced by the arithmetic unit 22. When tags are removed from the PTQQ 800 to be placed on the free list, it may be the case that although the arithmetic unit 22 is no longer using the associated register, there is a store operation for this register which has not yet completed. Thus, register tags on lines 340 and 350 are sent to the STQ 900 for comparison. If a compare occurs, there is a pending store to this register and the store queue 900 will return the tag to the FREE-LIS1 1000 over line 360.

The FREE-LIST 1000 contains a list of currently available physical registers. When incoming instructions need new physical registers to hold data, free registers are removed from the FREE-LIST 1000 and written to the mapping table 700 over lines 370 and 380.

Figure 5:
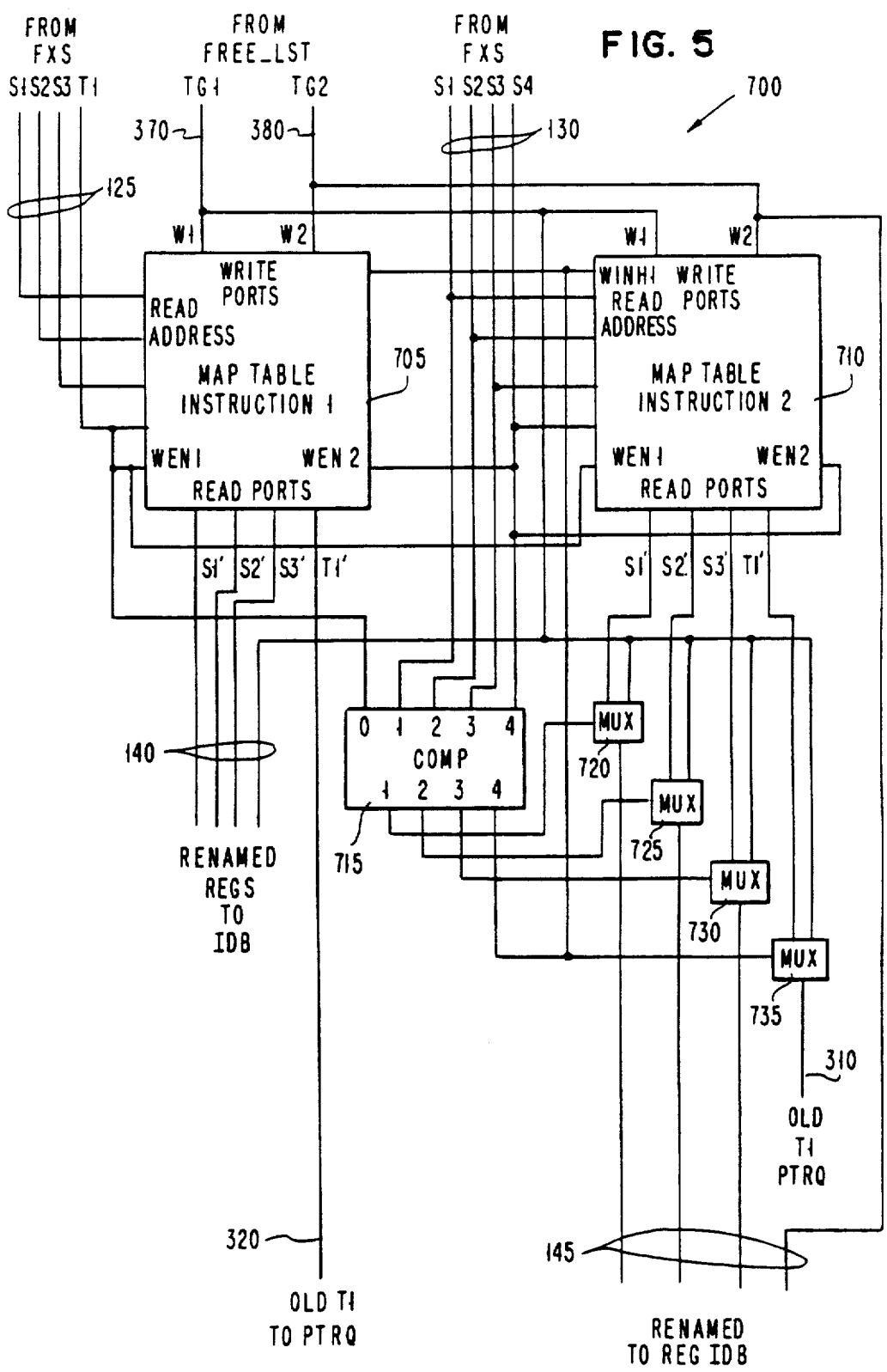
FIG. 5 is a block diagram representation of the mapping table which is shown generally in FIG. 4.

Refer now to FIG. 5 which depicts the map table 700 in more detail. The map table 700 is divided into 2 memories, each implemented as 4 read port/2 write port rams. A first memory 705 for instruction 1 and a second memory 710 for instruction 2. Register fields on line 125 from instruction 1 are used as read addresses to map table 705. Register fields on line 130 from instruction 2 are used as read addresses for map table 710. In response to the read addresses, the map tables simultaneously read out 4 new physical register tags each, labelled S1', S2', S3', and T1' which will replace the fields 125 or 130 in instruction 1 or instruction 2, respectively via lines 140 and 145.

For instruction 1, tags S1' S2', and S3' directly replace the 3 source register fields (S1, S2, S3) in the instruction 1. Target register tag T1, however addresses the map table 705 to read out the old tag T1' which will be placed on the PTRQ 800 via lines 320. The tag of a new (free) physical register will be written into the map table 705 entry for Tag T1 via port W1 subject to a compare result from comparator 715 to be described. The new tag is written via wire 370 from the FREE-LIST.

The map table 710 for instruction 2 will not be described in detail, as it functions similarly to map table 705. Tags from instruction 2 on lines 130 address map table 2 (710) and read out 4 entries S1', S2', S3' and T1' for instruction 2. The original register fields 130 are compared with the original target field $T_1$ of instruction 1 via the 4-way comparator 715. If a source S1, S2 or S3 of instruction 2 matches the target $T_1$ of instruction 1, a signal 1, 2, or 3 is produced by the comparator 715 to select TG1 on line 370 at the muxes 720, 725 and 730 respectively. The purpose of these compare signals and muxes 720, 725 and 730 is to ensure that instruction 2 uses the result produced by instruction 1 by accessing the physical register which contains the result for instruction number 1 it originally dictated by the incoming instruction.

The original target T1 on lines 130 of instruction 2 is also compared with the original target of instruction 1 on lines 125 at port 4 of comparator 715. If both targets are the same, the target chosen from the FREE-LIST for instruction 1 on line 370 is immediately placed on the PTRQ via the selection signal 4 of comp 715, mux 735 and lines 310. Also, signal 4 from comparator 715 inhibits the write of target TG1 on line 370 into map tables 705 and 710 via their WINH1 inputs. Then, target TG2 on line 380 from the FREE-LIST 1000 is written into both map tables 705 and 710 for entry T1 on lines 130 of instruction 2.

If the original targets are not the same, then signal 4 of comp 715 is not activated. Both TG1 on lines 370 and TG2 on lines 380 are written to the map table entries for their original T1's, respectively, and both old T1's are placed on the PTRQ 800 via lines 320 and 310.

The aforementioned procedure ensures that registers are mapped correctly, obeying the original register dependencies in the instruction stream, even though 2 instructions are processed in parallel.

Figure 6:
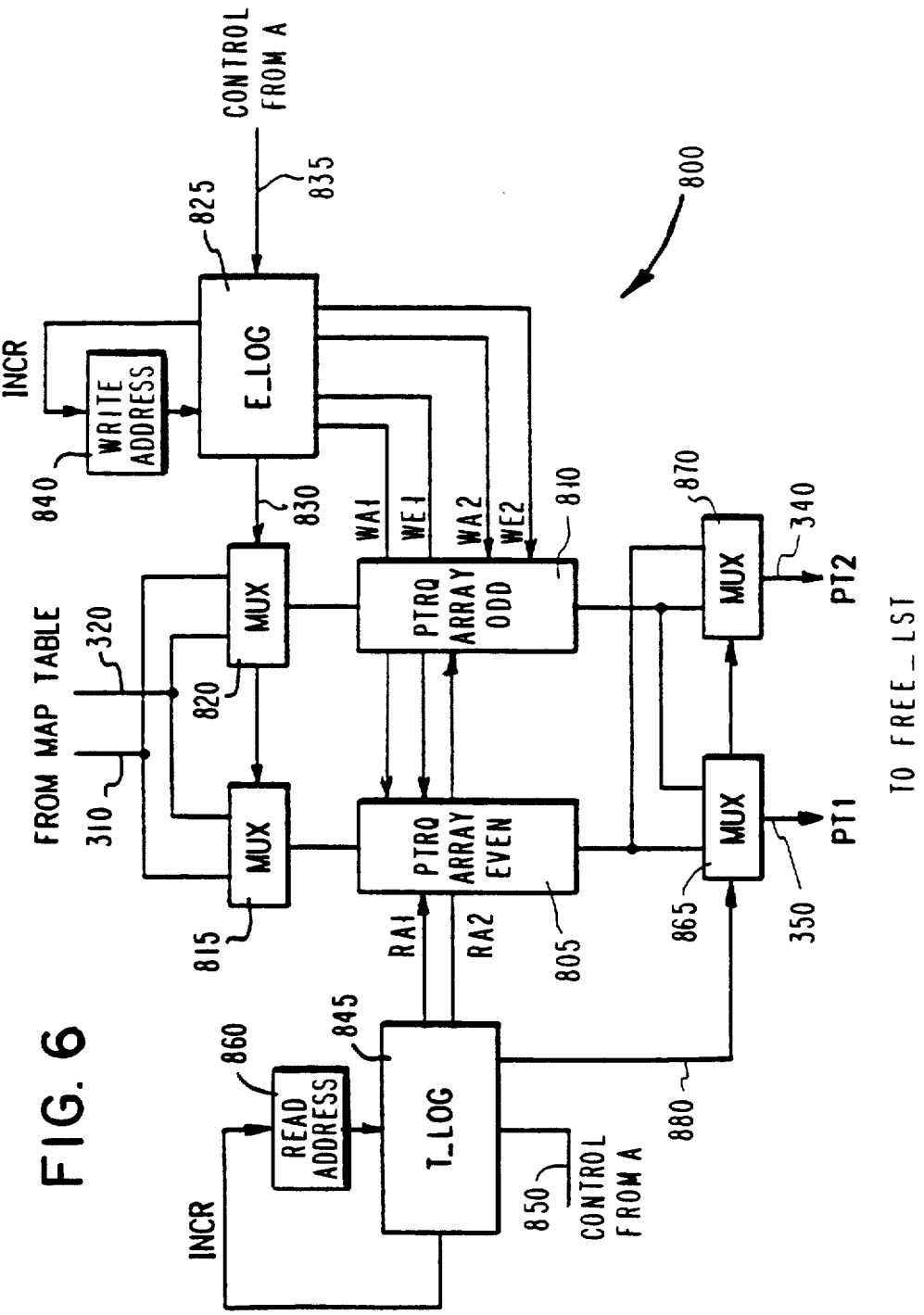
FIG. 6 is a block diagram representation of the pending target return queue which is shown generally in FIG. 4.

Refer now to FIG. 6 which depicts the PTRQ 800 of FIG. 4 in more detail. Tags corresponding to physical registers which will become free shortly are returned to the PTRQ from the map table 700 via lines 310 and 320. Under control of an E-LOG 825 they are written to the PTRQ arrays 805 and 810 based upon a decode of a write address register 840.

The WA reg 840 points to the tail entry of the PTRQ. By decoding the WA 840 the tags are routed through multiplexors 815 and 820 selected by a control signal on line 830 by the E-LOG 825. A control signal on line 835 specifies the number of tags to be written and the WAS register 840 is updated with the value INCR from the E-LOG 825 based upon this amount. Finally, E-LOG 825 controls writing to the PTRA arrays 805 and 810 via write address and write enable lines WA1, WA2, WE1, and WE2 respectively.

A T-LOG 845 provides read addresses RA1 and RA2 to the PTRQ arrays 805 and 810 in order to read out PTRQ tags. The RA (read address) register 860 contains the address of the head of the PTRQ and after comparing it with the release pointer in block 845, T-LOG 845 selects multiplexors 865 and 870 via control line 880 to provide tags to the free-list 1000 and the STQ 900 via lines 340 and 350. T-LOG 845 then increments the RA register 860 based upon control signals on line 850, specifying the number of tags to be removed, provided by the control unit 18 (FIG. 1).

Figure 7:
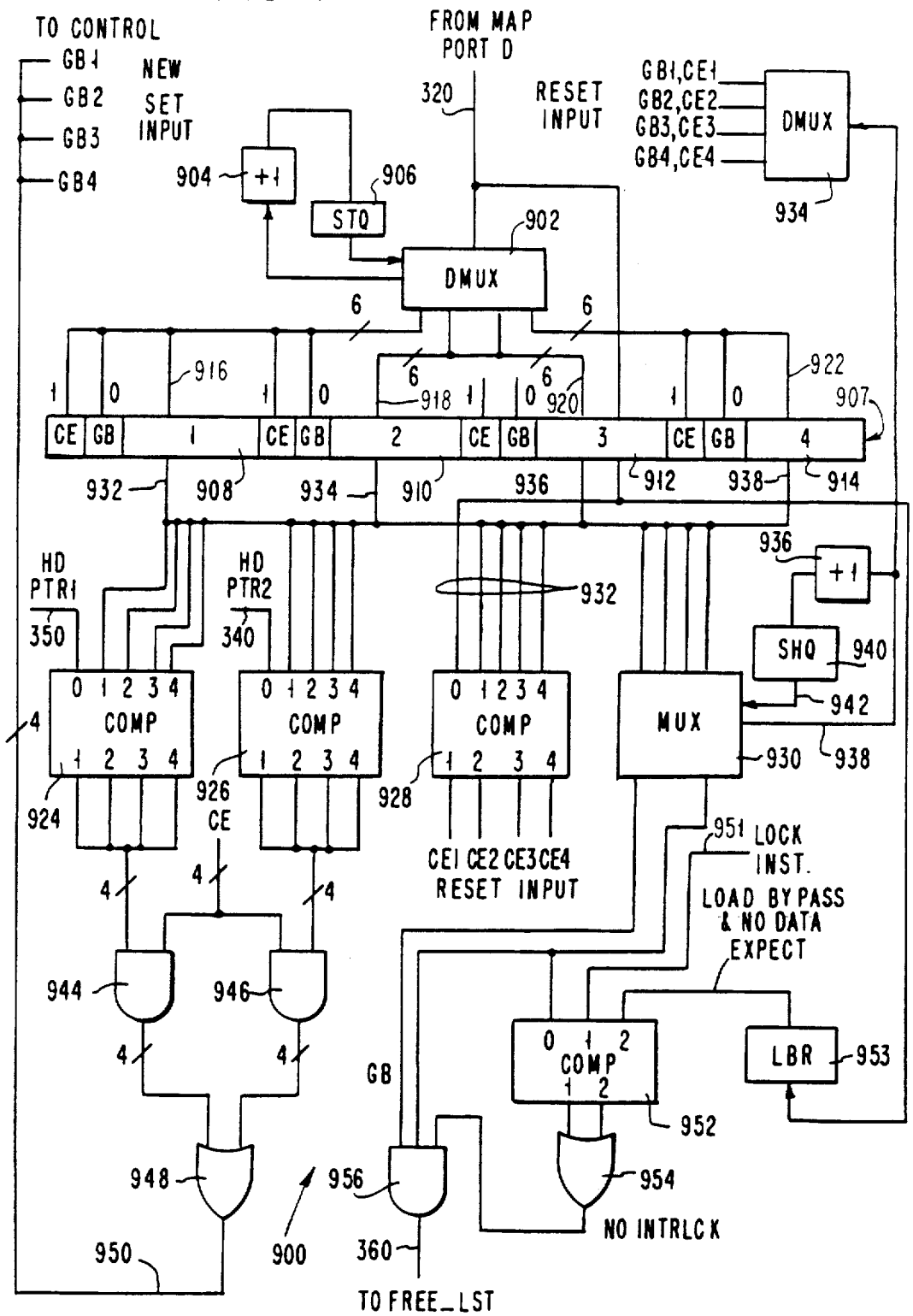
FIG. 7 is a block diagram representation of the store queue which is shown generally in FIG. 4.

Refer now to FIG. 7 which depicts the detail of the STQ 900. One register tag per cycle is provided by the mapping table logic 700 over line 320 to a demultiplexor 902 which routes the tag to one of 4 STQ entries 908, 910, 912, and 914, via lines 916, 918, 920, and line 922 respectively. The DMUX logic 902 then increments the tail pointer of the STQ 906 as tags are written.

When a new tag on line 320 is to be placed on the STQ 906, it must be identified as the last store operation of a particular physical register. The Compare Enable (CE) bits in STQ entries 908, 910, 912 and 914 of PSQ 907 perform this function. (The reason for this identification will be explained shortly). An incoming tag on line 320 is compared with 4 entries on the PSQ 907 via comparator 928. If the incoming tag compares with a PSQ tag from entry 908, 910, 912 or 914, whose CE bit is on, the corresponding compare signal 1, 2, 3 or 4 from comparator 928 is activated. The compare signal CE1, CE2, CE3 or CE4 is then routed via demux 934 to reset the compare enable bit CE of the corresponding PSQ entry 908, 910, 912 or 914. The CE bit of the entry corresponding to the queue location where the new tag will be written is then set to 1. The Give Back (GB) bit of this entry is initialized to 0. To see that the CE bits identify the latest entry on the PSQ of a particular register tag consider the following example. Assume entry 1 of 908 contains tag = 4 and the CE bit is 1. Assume entry 1 is the only queue entry and line 320 contains an incoming tag for register 4. In this case the CE1 signal of comparator 928 will be activated. The CE bit of entry 1 of 908 will be reset and the tag on line 320 will be written to entry 2 of 910. Its CE bit will be set to ONE, identifying entry 2 as the last entry on the PSQ for tag 4.

The reason for the CE bit is as follows. As comparators 924 and 926 are provided to compare tags on lines 340 and 350 from the PTRQ 800 for the purpose of checking whether the STQ 900 is done with the physical registers 340 and 350 about to be freed. If no compares result, no stores presently on the STQ need the physical registers contained on lines 340 and 350 and the tags are immediately placed on the FREE-LIST 1000. If, however, a compare results then at least one store compares with one of the tags. In this event the tags on lines 340 and 350 which compare cannot be immediately returned to the FREE-LIST 1000. Instead, the store queue, when it has finished with the last store of a particular tag, will return the tag via line 360 to the FREE-LIST 1000. The CE bits identify the last store of a particular tag; AND gates 944 and 946 ensure only the last tag will result in a compare; these results are bit-ored at or-gate 948 to generate so-called give-back (GB) signals GB1, GB2, GB3 and GB4 to get the give-back bits for PSQ entries 908, 910, 912 and 914, respectively.

In order to remove a tag from the STQ 900 the following logic is employed. Register SHQ 940 is decoded and selects mux 930 via lines 942 to access the head entry of the store queue. This tag is compared at comparator 952 with 2 other tags to determine if the head entry of the STQ can be removed, and corresponding physical register sent to a data buffer for eventual transmission to memory. The quantities compared against S are LOCK INT on line 951, which is the register currently being computed by the arithmetic unit 22, and the register currently being loaded from memory whose tag is contained in Load Bypass Register (LBR) 953. If a compare results, signal 1 and 2 of comp 952 is energized. If no compare results, AND gate 956 is enabled and results in the release of the store from the STQ. If the GB bit of the entry being released is set, line 360 returns the tag to the FREE-LIST 1000. Then incrementor 936 updates the SHQ register 940.

Figure 8:
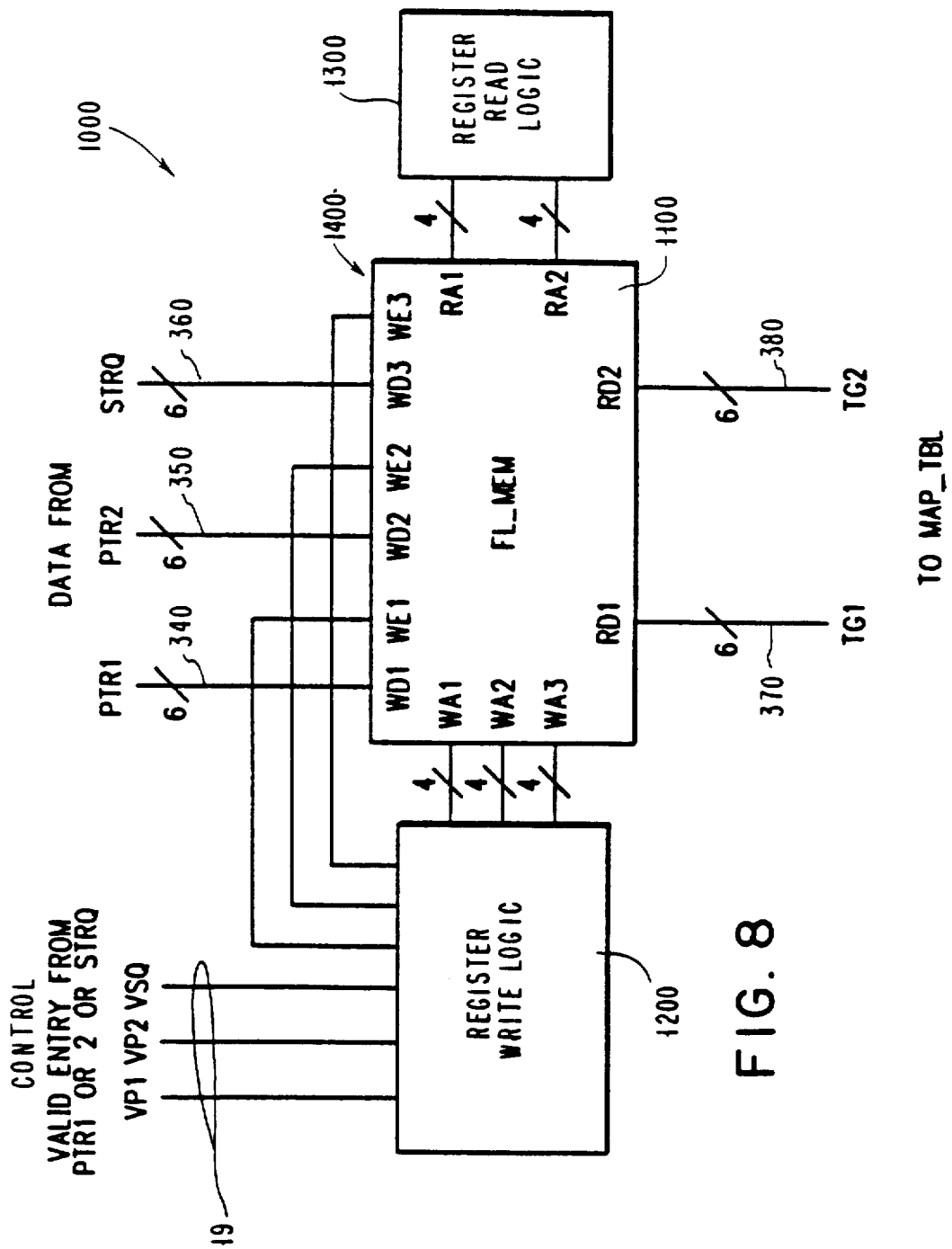
FIG. 8 is a block diagram representation of the available register queue which is shown generally in FIG. 4.

Refer now to FIG. 8 which depicts the FREE-LIST 1000 in more detail. As previously described, lines 3401 350 and 360 provide tags to the FREE-LIST from the PTRQ 800 and STQ 900. Write address logic 1200, controls the writing of free tags onto the FREE-LIST MEM 1100 which is maintained as a 3-write port/2 read port memory. Write address logic 1200 provides 3 write presses WA1, WA2, WA3 to FL-MEM 1100 and write enables WE1, WE2 and WE3 based upon control information 19 from the control unit 18.

Read address logic, 1300 provides read address RA1 and RA2 to FL-MEM 1100 based upon the head of the FREE-LIST. New tags are available to the mapping table 700) over lines 370 and 380. As tags are read the head pointer in 1300 is incremented.

Figure 9:
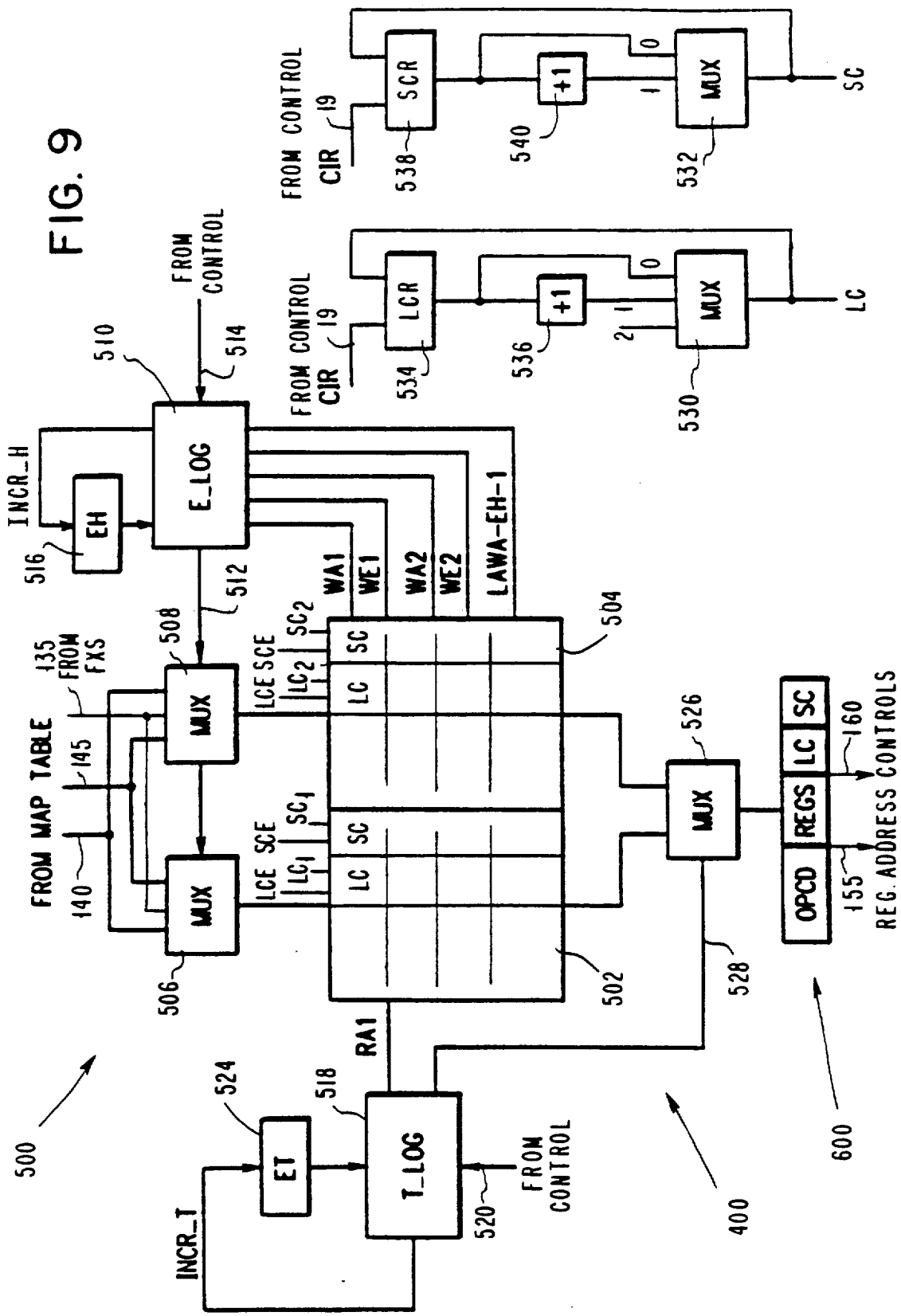
FIG. 9 is a block diagram representation of the instruction decode buffer which is shown generally in FIG. 2.

Refer now to FIG. 9 which depicts block 400 of FIG. 2, which contains the IDB 500 and the decode register 600.

The instruction decode buffer 500 is implemented as 2 memories, 502 and 504. Instructions containing renamed register fields from the map table on lines 140 and 145 are combined with their opcodes on line 135 from FXS stage logic 200 and are written to 502 and 504 after being routed through multiplexors 506 and 508. Write logic E-LOG 510 controls the writing of instructions into the IDB arrays 502 and 504 by controlling muxes 506 and 508 via select line 512 and by generating write address and write enable on lines WA1, WA2, WE1 and WE2 respectively. Registers EH 516 is updated by E-LOG 510 via lines Incr-H as instructions, are written based upon control signals on line 514 from the control unit 18 specifying the number of instructions to be written.

Instructions routed through muxes 506 and 508 may also be passed directly to the decode register 600 via mux 526. Normally instructions already in the IDB array 502 and 504 will be selected one at a time by T-LOG 518 to be latched into the decode register 600 by selecting the mux 526 by control signals on line 528. The T-LOG read control logic 518 accesses a row of the IDB arrays 502 and 504 and activates select line 528 by decoding the ET's register content 524. As instructions are read into the decode register 600 the T-LOG 518 increments the ET register 524 via line INCR-T.

Shown in FIG. 9 are two registers LCR 534 and SCR 538 which contain a current load count and store-count, respectively. LCR 534 contains a load count (LC) value which is incremented or selected via incrementor 536 and mux 530 to form a LC value which is written into the LC fields of both IDB arrays 502 and 504 and the LC field of the decode register 600. Similarly the SCR register 538 contains a store count (SC) which can be incremented or selected via incrementor 540 and mux 532 to provide a store count for the SC fields in both IDB arrays 502 and 504 and the SC field in the decode register 600.

Actually several copies of the LCR, SCR and associated logic are used in the implementation to increment the load count fields and store count fields in the decode register 600 and the IDB arrays 502 and 504.

The Decode register 600 provides an opcode on line 155 and register tags on line 160 to the arithmetic unit 22 in order to initiate arithmetic operations.

Example of Register Renaming in System Operation

To illustrate the system operation of this instruction control mechanism, consider the following example. Assume that the following 6 instructions exist in the FXS buffers, in the listed program sequence.

| | |
|---|---|
| L FR1, r3, r4 | *load FPR1 with data from memory address r3 + r4 |
| L FR2, r5, r6 | *load FPR2 with data from memory address r5 + r6 |
| M FR3, FR1, FR2 | *multiply FR1 by FR2 and place result into FR3 |
| L FR4, r5, r6 | *load FPR4 with data from memory address r5 + r6 |
| A FR5, FR3, FR4 | *add FR3 to FR4 and place the sum into FR5 |
| ST FR5, r7, r8 | *store the sum into memory address r7 + r8 |

The operation of the control mechanism for this program sequence is described below.

Figure 10:
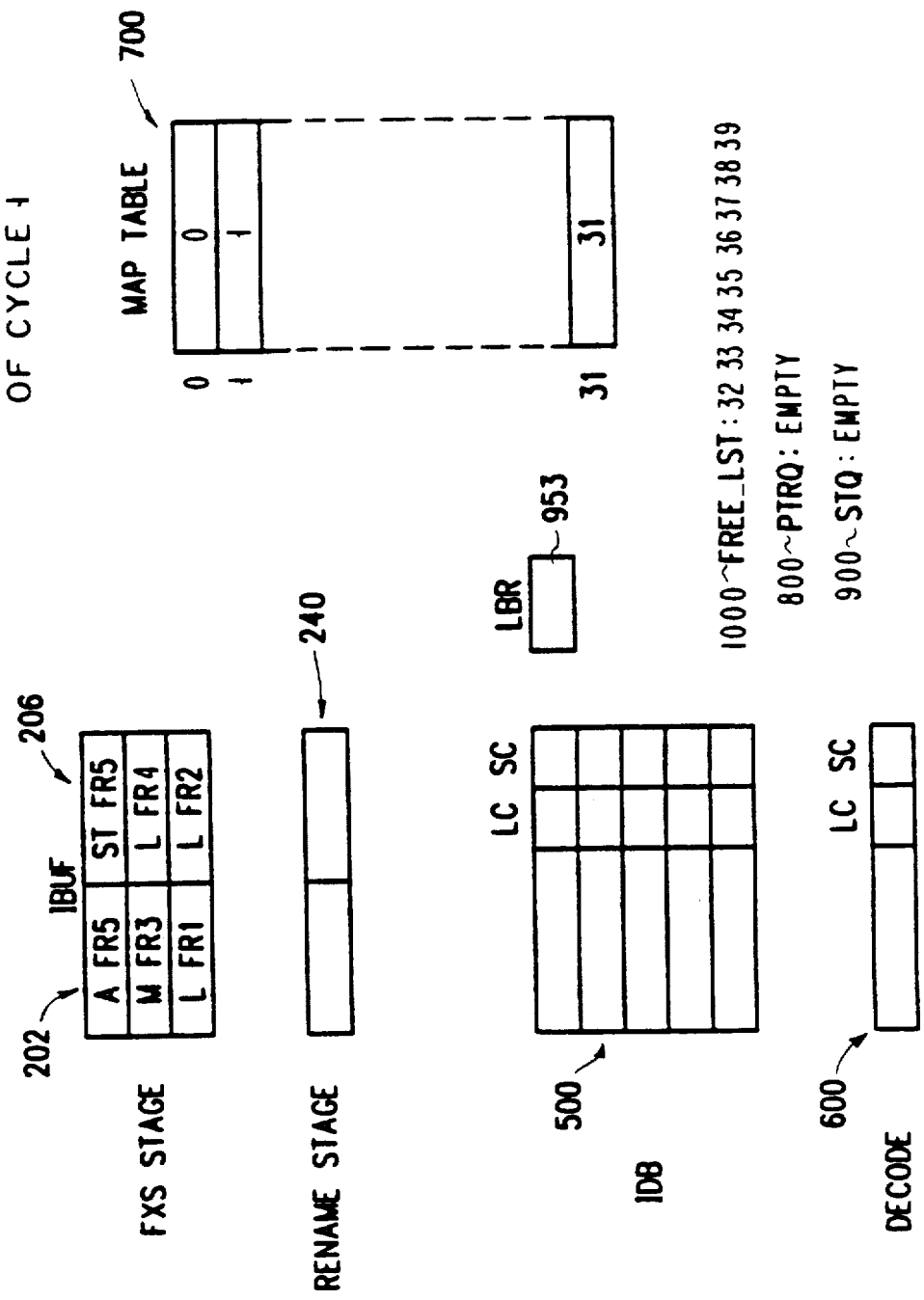

Cycle 1 (FIG. 10)—Assume that there are 40 physical and 32 architected floating point registers. Also assume that this sequence occurs just after a reset state, so that the IDB buffers and the Decode stage are empty, the Map Table is initialized to identity the Free List has eight register tags on it, and the PTRQ is empty. Since the FXS stage can process two instructions per cycle, both loads will be in FXS1 and FXS2, respectively, at the same time. FIG. 10 diagrams the state of the machine at this cycle.

Figure 11:
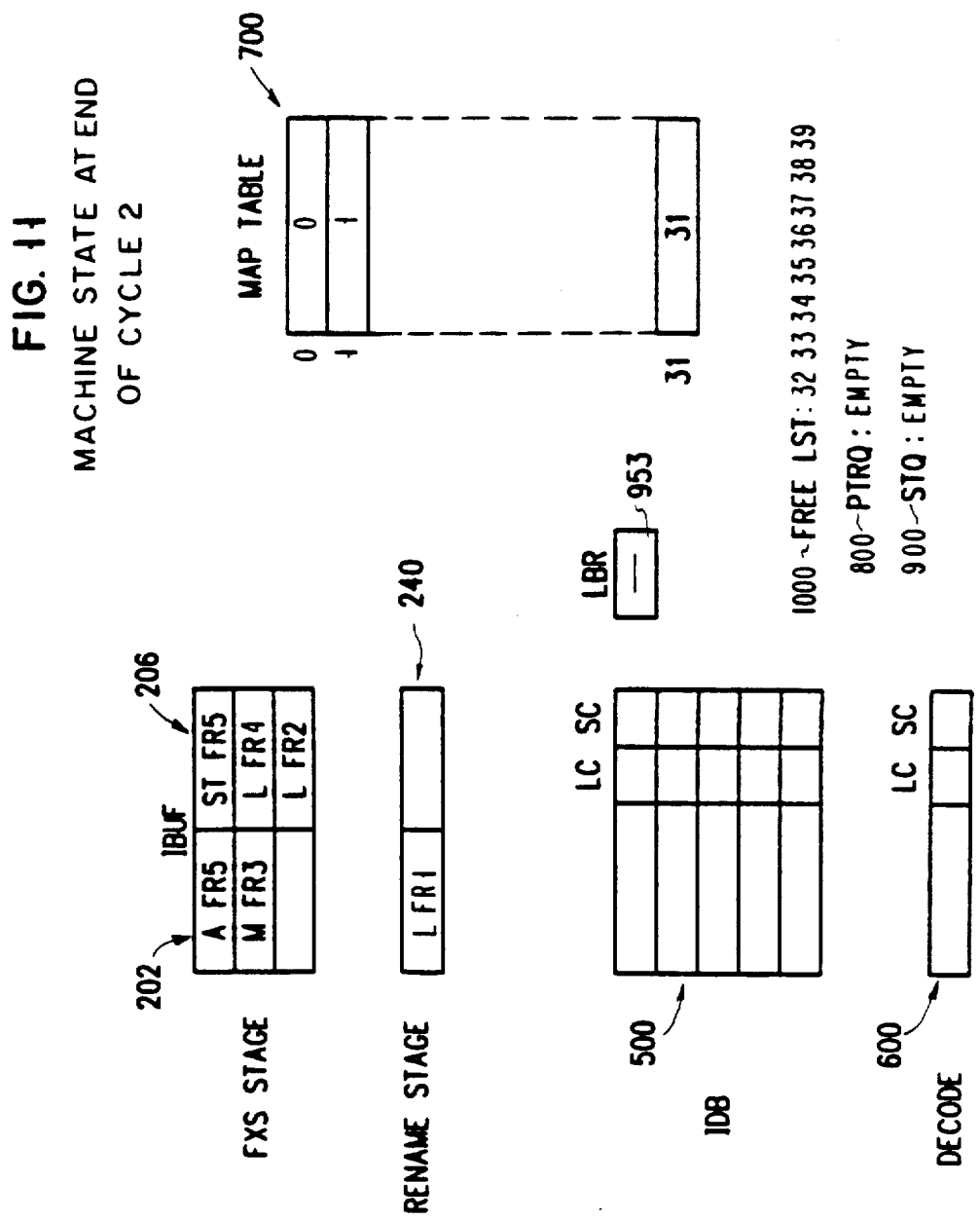

Cycle 2 (FIG. 11)—Only one load can be processed per cycle by the CPU. During Cycle 2, L FR1 is processed by the CPU. At the end of the cycle, the register tag and the decoded instruction passes into REN1, and the FXS buffer pointer is incremented by 1 so that the second load, L FR2, is now at the head of the FXS stage. The multiply is the second instruction in the FXS stage. Since the multiply is a coprocessor instruction, and does not have to be processed by the CPU, both L FR2 and M will pass from the FXS stage into the rename stage. The output buffer pointer for the FXS stage will be incremented by 2 at the end of cycle 2. During the rename cycle, L FR1 is renamed, according to the previously discussed rules. The old value of register 1, which happens to be 1, is placed on the PTRQ. The head of the free list, register number 32, is written into Map Table entry number 1. At the end of the cycle, L FR1 moves to the LBR. This depicts the locations of the instructions and the contents of the various queues at the beginning of cycle 3. Since the IDB and decode stages are empty the tag at the head of the PTRQ is eligible to be returned to the tail of the Free List. The tag is compared with the contents of the STQ, but since there are no valid stores, no compares result.

Figure 12:
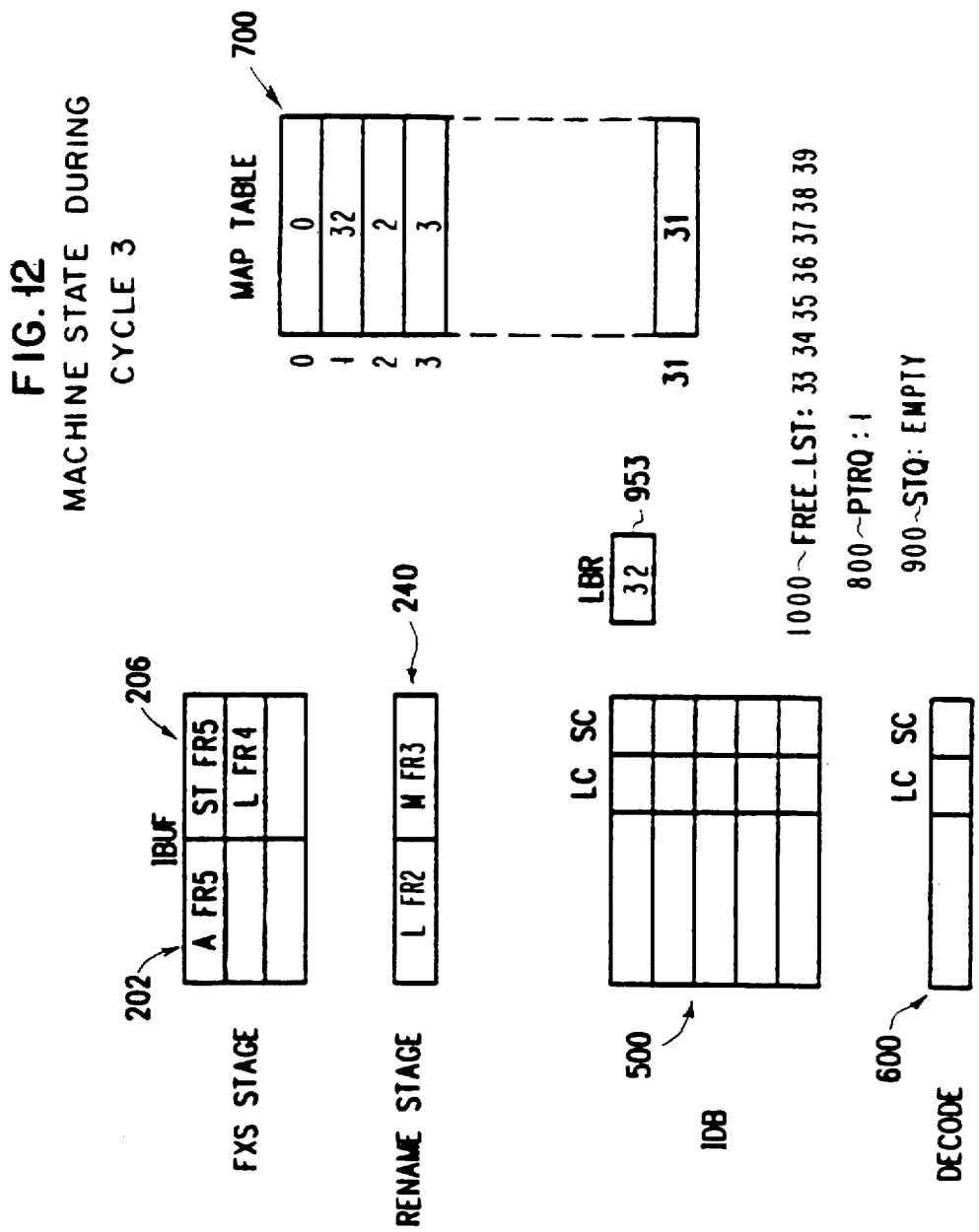

Cycle 3 (FIG. 12—At the end of this cycle, the load data will return and L FR1 will have completed execution. However, L FR2 is remapped. The old tag for logical register 2 (which happens to be physical register 2) is placed on the PTRQ. Then the new mapping, register 33, is written to location 2 of the map table and tag 33 is removed from the Free list. The multiply is also remapped during this cycle and logical register 3 is remapped to physical register 34. The source registers of the multiply, 1 and 2, are remapped to 32 and 33, respectively. The load count field of the multiply instruction is set to 1; and the store count field to 0. At the end of cycle 3, the multiply will pass to the Decode stage since the IDB stage buffers are empty. L FR2 will be placed on the LBR. Since L FR2 and M both complete the remap stage, the L FR4 and A instructions will be removed from the FXS buffers, leaving the final store (ST).

Figure 13:
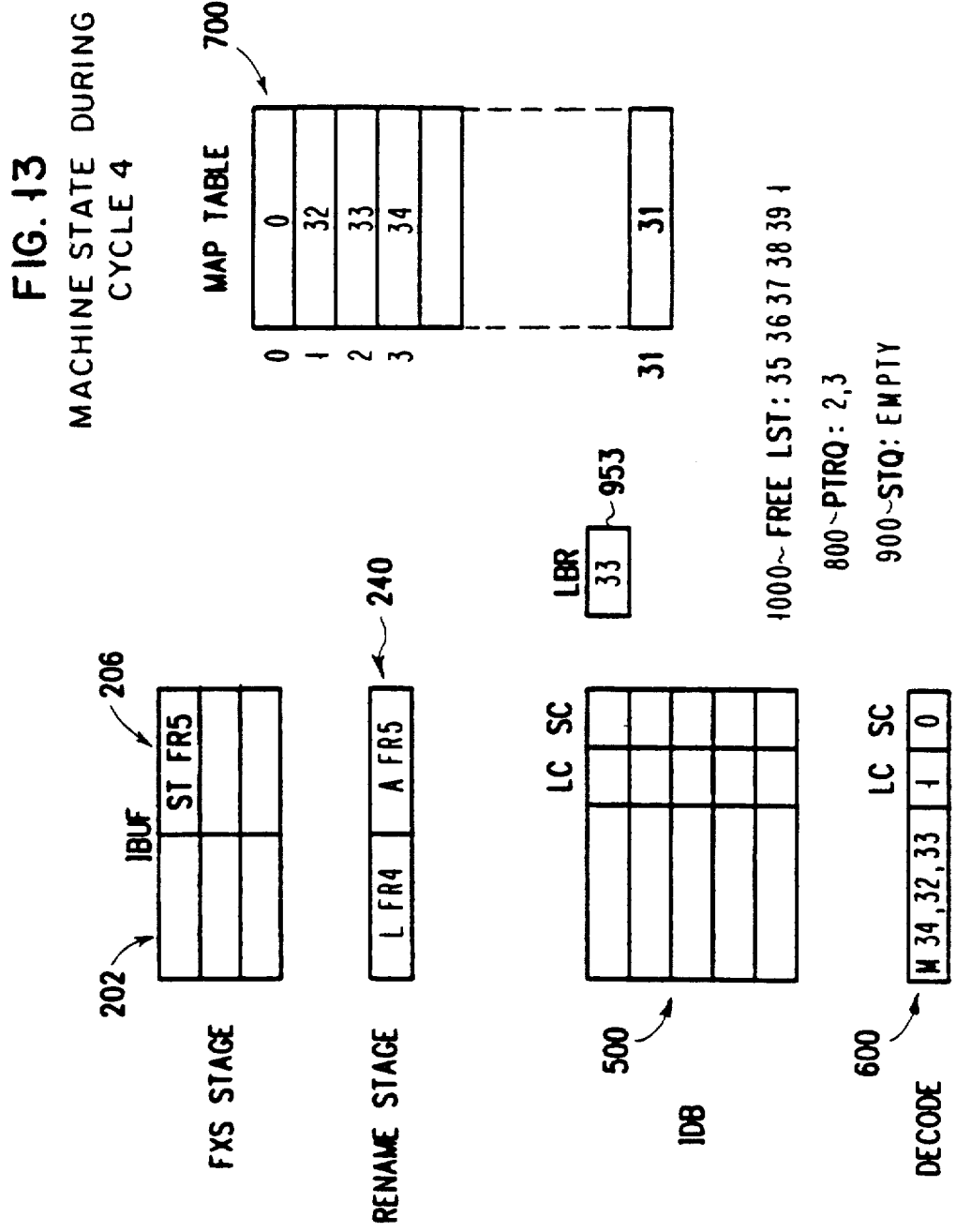

Cycle 4 (FIG. 13)—During this cycle, assume that the multiply is held in decode for some unimportant reason. The L and A successfully are remapped as follows. The load is remapped to register 35; the load count field of the multiply, in decode, is incremented by 1 to become 2. Tag 4 is placed on the tail of the PTRQ. The add instruction is remapped; source registers 3 and 4 are remapped to 34 and 35, respectively. The target is remapped to register 36 and tag 5 is added to the PTRQ tail position. Since the multiply is held in decode, at the end of the cycle the load will enter the LBR but the add will be placed into the head IDB buffer position.

Figure 14:
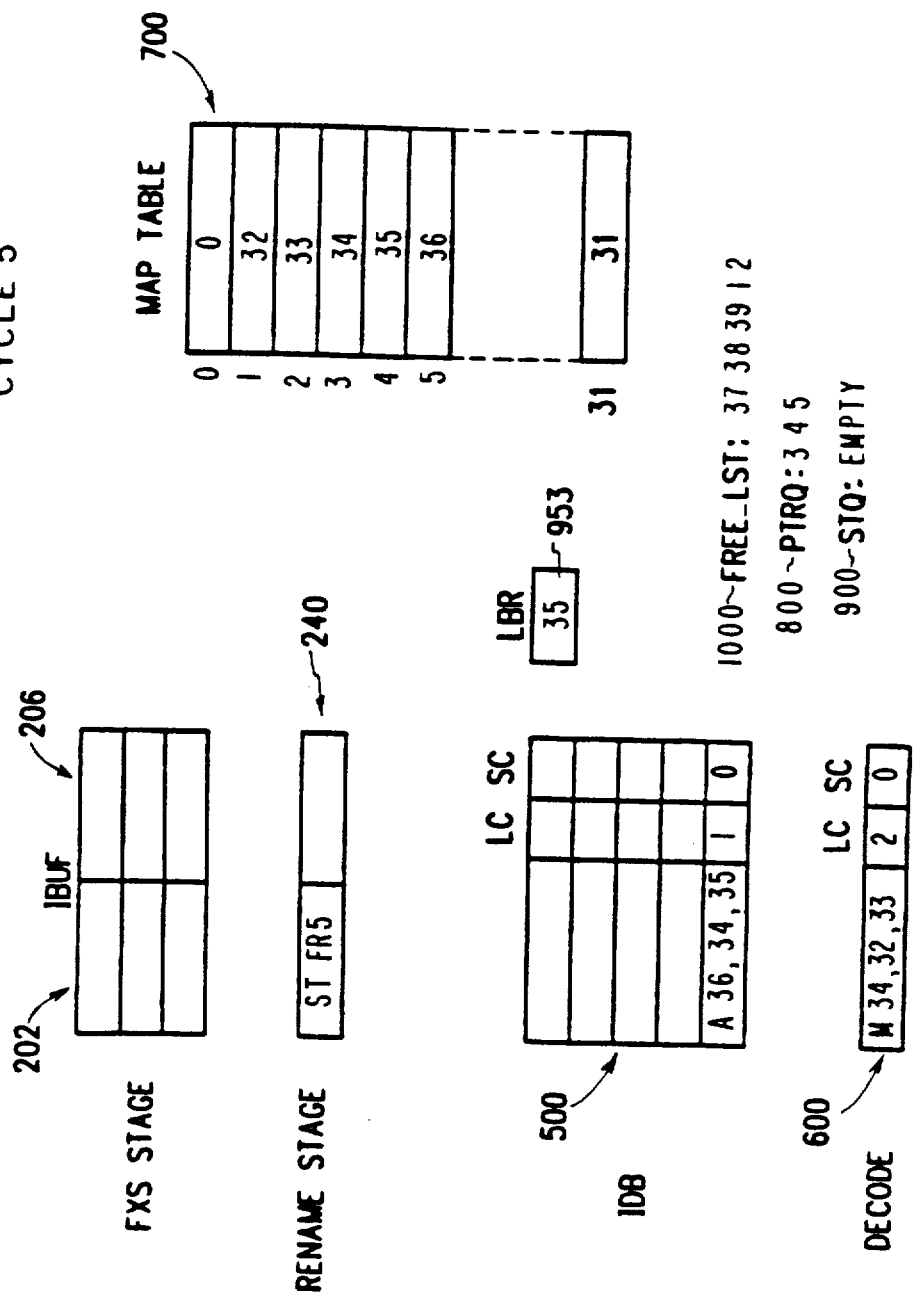

Cycle 5 (FIG. 14)—The floating point store is now in rename and is mapped to register 36. It counts into the store count field of the A and is then placed on the STQ. Assuming the Multiply decodes this cycle, the A will pass from the IDB into decode. When the multiply decodes since its load count is 2, it releases 2 tags from the PTRQ which will be placed on the Free list after comparison with the contents of the STQ (which is empty).

Figure 15:
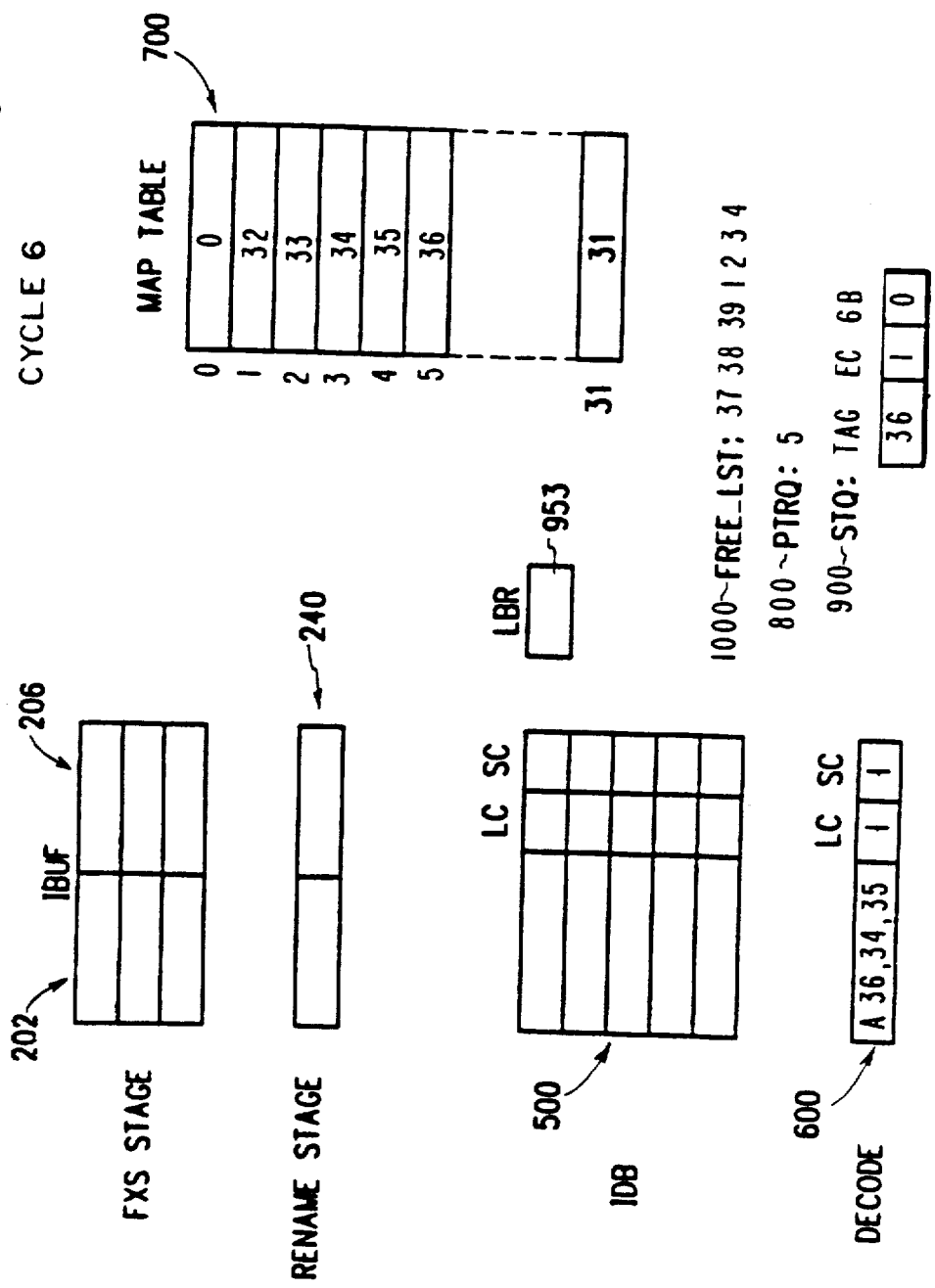

Cycle 6 (FIG. 15)—The floating point A will pass decode, and release a tag from the PTRQ at the end of the cycle, as well as releasing an entry from the STQ. When the A finishes execution in several cycles, the floating point store on the STQ will execute and be removed from the STQ.

Cycle 7 (FIG. 16)—The floating point A is in its first cycle of execution an is not shown in FIG. 16. The store is waiting for the A to complete and produce the floating point data for physical register 36. Note that the CE bit is set to 1 to allow comparisons between subsequent stores.

Cycle 8 (FIG. 17)—The floating point A has finished execution, and the store has been removed from the STQ 900 since its data was made available. Since no instructions remain in the machine, all extra registers are marked FREE and are available on the FREE_LST.

While the example above does not illustrate all nuances of the instruction control mechanism, it does illustrate the main features, notably the remapping of architected registers to physical registers. Coprocessor loads and stores are overlapped with the decoding and execution of coprocessor arithmetic operations.

INDUSTRIAL APPLICABILITY

It is an object of the invention to provide an improved instruction control mechanism for a computing system.

It is another object of the invention to provide an improved instruction control mechanism for a CPU-Coprocessor Complex.

It is yet another object of the invention to provide parallelism among floating point operations in a CPU-Coprocessor Complex.

It is still another object of the invention to provide a register renaming scheme for a computing system.

It is a further object of the invention to provide register renaming scheme to provide parallelism among floating point operations in a CPU-Coprocessor Complex.

It is yet a further object of the invention to provide a register renaming scheme for a CPU-Coprocessor Complex which permits loads and stores to be processed in parallel with arithmetic instructions.

Having thus described our invention, what we claim as new, and desire to secure by Letters Patent is:

1. A register renaming apparatus for a computing system having a main memory comprising addressable locations containing data and instructions, said instructions including a plurality of fields including an operation field specifying an operation to be performed and at least one register designation field, each such register designation field being indicative to two of n architectures registers for receiving data according to the operation specified in said operation field, said computing system including m physical registers, where m>n, comprising:

a map table having n locations indicative of said n architected registers, with each entry in said n locations containing the number of different ones of said m physical registers, with the architected register designation in said register designation field being replaced by the physical register number in the corresponding location in said map table prior to the associated instruction being executed;

a free list of the ones of said m physical registers which are currently not assigned to architected register locations in said map table, and which are available for future assignment to said map table;

a holding register queue which receives remapped physical register designations from said map table of certain ones of said physical registers which are being utilized by instructions presently being executed, with said holding register queue temporarily storing said certain one of said physical register designations prior to entering them in said free list of physical registers following the execution of their associated instructions; and a store queue which has a physical register designation stored therein of a store operation to a register designated in said map table;

means for comparing physical register designations stored in the store queue with the physical register designations stored in said holding register queue, which have executed their associated instructions, with all such physical register designations in the holding register queue which do not compare being made available to the free list; and means for determining that all stores are complete for the physical register designations that do compare, with such physical register designations that compare being made available to the free list following the determination that all associated stores are complete.

2. A register renaming apparatus for two instructions at a time for a coprocessor system having a main memory comprising addressable locations containing data and instructions, said instructions including a plurality of fields including an operation field specifying an operation to be performed and at least two register designation fields, each such register designation field including a tag indicative of one of n architected registers for receiving data according to the operation specified in said operation field, said computing system including a physical registers, where m>n, comprising:

- a map table having n locations indicative of said n architected registers, with each entry in said n locations containing the number of different ones of said m physical registers, with the architected register tag in said register designation field being replaced by a physical register number tag in the corresponding location in said map table prior to the associated instruction being executed;
- a free list of the tags of the ones of said m physical registers which are currently not associated to architected register locations in said map table, and which are available for future assignment to said map table;
- a pending target return queue which receives remapped physical register tags from said map table of certain ones of said physical registers which are being utilized by instructions presently being executed, with said pending target return queue temporarily storing said certain ones of said physical register tags prior to entering them in said free list of physical registers following the execution of their associated instructions; and
- a store queue which has a physical register tag stored therein of a floating point store operation to a register designated in said map table, said store queue including means for comparing the physical register tags stored therein with the physical register tags stored in said pending target return queue which have executed their associated instructions, with all such physical tags in the pending target return queue which do not compare being made available to said free list, said store queue including means for determining that all stores are complete for the physical register tags that do compare, with such physical register tags that compare being made available to the free list following the determination that all associated stores are completed.

3. In a central processor-coprocessor system, the combination comprising:

- a main memory comprising addressable locations containing data and instructions, said instructions including a plurality of fields including an operation code field specifying an operation to be performed such as a load operation or a store operation or a floating point arithmetic operation, and at least two register designation fields, each such register designation field including a register tag indicative of one of n, where n is an integer, architected registers for receiving data according to said operational code field;
- a central processor which provides address information to the addressable address locations of said main memory for receiving instructions and data, and also providing a synchronization signal for a coprocessor;
- a coprocessor comprising:
  - a control unit for receiving said synchronization signal from said central processor unit and instructions from said main memory;
  - a register field comprised of m, where m is an integer, physical registers for receiving data from main memory according to said instructions, and addresses from said control unit;
  - a floating point arithmetic unit for receiving unit data from said register file and said main memory in accordance with said instructions and receiving control information from said control unit;
  - register renaming means for receiving the architected register tags of instructions from said control unit, and providing physical register tags in place of said architected register tags to said control unit, said register renaming means comprising:
    - a map table having n locations indicative of said n architected registers, with each entry in said n locations containing the number of different ones of said m physical registers in said register file, with the architected register tag in said register designation field being replaced by the physical register number tag in the corresponding location in said map table prior to the associated instruction being executed;
    - a free list of the tags of the ones of said physical registers in said register file which are currently not assigned to architected register locations in said map table, and which are available for future assignment to said map table;
    - a pending target return queue which receives physical register tags from said map table of certain ones of said physical registers in said register file which are being utilized by said floating point arithmetic unit, with said pending target return queue temporarily storing said physical register tags prior to entering them in said free list of physical registers following the execution of their associated instruction; and
    - a store queue which has a physical register tag stored therein of a store to a register designated in said map table, said store queue including means for comparing the physical register tags stored therein with the physical register tags stored in said pending target return queue which have executed their associated instructions with all such physical tags in said pending target return queue which do not compare being made available to the free list, said store queue including means for determining that all stores are complete for the physical register tags that do compare, with such physical register tags that do compare being made available to the free list following the determination that all associated stores are complete.

4. In a central processor-coprocessor system, the combination comprising:

- a main memory comprising addressable locations containing data and instructions, said instructions including a plurality of fields including an operation code field specifying an operation to be performed such as a load operation or a store operation or a floating point arithmetic operation, and at least two register designation fields, each such register designation field including a register tag indicative of one of n, where n is an integer, architected registers for receiving data according to said operational code field;

a central processor which processes said load and store operations, and provides address information to the addressable address locations of said main memory for receiving instructions and data, and also providing a synchronization signal for a coprocessor;

a coprocessor which processes said floating point arithmetic operations, comprising:

a control unit for receiving said synchronization signal from said central processor unit and instructions from said main memory, said control unit comprising:

a synchronization unit which receives said synchronization signal from said central processor unit, and separates the operation code field from the architected register tags in each instruction;

an instruction decode buffer which receives the operation code field from said synchronization unit and physical register tags from a register remaining means for each instruction; and a decoder for receiving instructions from said instruction decode buffer and decoding them for provision to a register file and arithmetic unit;

a register file comprised of m, where m is an integer, physical registers for receiving data from main memory according to said instructions, and addresses from said decoder;

a floating point arithmetic unit for receiving data from said register file and said main memory in accordance with said instructions and receiving control information from said decoder;

register remaining means for receiving the architected register tags of instructions from said synchronization unit, and providing physical register tags in place of said architected register tags to said instruction decode buffer, said register renaming means comprising:

a map table having n locations indicative of said n architected registers, with each entry in said n locations containing the number of different ones of said m physical registers in said register file, with the architected register tag in said register designation field being replaced by the physical register number tag in the corresponding location in said map table prior to the associated instruction being executed;

a free list of the tags of the ones of said physical registers in said register file which are currently not assigned to architected register locations in said map table, and which are available for future assignment to said map table;

a pending target return queue which receives physical register tags from said map table of certain ones of said physical registers in said register file which are being utilized by said floating point arithmetic unit, with said pending target return queue temporarily storing said physical register tags prior to entering them in said free list of physical registers following the execution of their associated instructions; and a store queue which has a physical register tag stored therein of a store to a register designated in said map table, said store queue including means for comparing the physical register tag stored therein with the physical register tags stored in said pending target return queue which have executed their associated instructions, with all such physical tags in said pending target return queue which do not compare being made available to the free list, said store queue including means for determining that all stores are complete for the physical register tags that do compare, with such physical register tags that do compare being made available to the free list following the determination that all associated stores are complete.

5. A method of register renaming for a computing system having main memory comprising addressable locations containing data and instructions, said instructions including a plurality of fields including an operation field specifying an operation to be performed and at least two register designation fields, each such register designation field including a tag indicative of one of n architected registers for receiving data according to the operation specified in said operation field, said computing system including m physical registers, where $m > n$, said method comprising the steps of:

maintaining a map table having n locations indicative of said n architected registers, with each entry in said n locations containing the number of different ones of said m physical registers, with the architected register tag in said register designation field being replaced by a physical register number tag in the corresponding location in said map table prior to the associated instruction being executed;

maintaining a free list of the tags of the ones of said m physical registers which are currently not assigned to architected register locations in said map table, and which are available for future assignment said map table;

maintaining a pending target return queue which receives remapped physical register tags from said map table of certain ones of said physical registers which are being utilized by instructions presently being executed, with said pending target return queue temporarily storing said certain ones of said physical register tags prior to entering them in said free list of physical registers following the execution of their associated instruction;

maintaining a store queue which has a physical register tag stored therein of a floating point store operation to a register designated in said map table;

comparing the physical register tags stored in stored queue with the physical register tags stored in the pending target return queue which have executed their associated instructions, with all such physical register tags in the pending target return queue that do not compare being made available to the free list; and determining that all stores are complete for the physical register tags that do compare, with such physical register tags being made available to the free list following the determination that all associated stores are complete.

* * * * *